US012784170B1

(12) United States Patent
Pham et al.

(10) Patent No.: US 12,784,170 B1
(45) Date of Patent: Nov. 3, 2026

(54) SYSTEM AND METHOD FOR VEHICLE CONDITION ASSESSMENT USING CORRELATED THREE-DIMENSIONAL GEOMETRIC ANALYSIS AND ON-BOARD DIAGNOSTIC DATA

(71) Applicant: Innova Electronics Corporation, Irvine, CA (US)

(72) Inventors: Phuong Pham, Fountain Valley, CA (US); Keith Andreasen, Garden Grove, CA (US); Thuan Cong Huynh, Ho Chi Minh City (VN); Thanh Vo, Gia Lai Province (VN); Dung Nguyen, Quang Ngai Province (VN)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 19/556,130

(22) Filed: Mar. 4, 2026

(51) Int. Cl.
*G06T 7/00* (2017.01)
*G06T 7/60* (2017.01)
(Continued)

(52) U.S. Cl.
CPC .............. *G06T 7/0002* (2013.01); *G06T 7/60* (2013.01); *G06T 7/73* (2017.01); *G06T 15/205* (2013.01);
(Continued)

(58) Field of Classification Search
None
See application file for complete search history.

(56) References Cited

U.S. PATENT DOCUMENTS 10,636,148 B1 * 4/2020 Chen ........................ G06T 7/194
11,068,560 B2 7/2021 Chen
(Continued)

FOREIGN PATENT DOCUMENTS

WO WO-2025027539 A1 * 2/2025 ........... G06T 7/0004

OTHER PUBLICATIONS

Svensson et al., "Vehicle Diagnostics Method by Anomaly Detection and Fault Identification Software," SAE Int. J. Passeng. Cars—Electron. Electr. Syst. 2(1):352-358, 2009, doi:10.4271/2009-01-1028.*

*Primary Examiner* — Guillermo M Rivera-Martinez
(74) *Attorney, Agent, or Firm* — Stetina Garred Brucker & Newboles

(57) ABSTRACT

A system and method for mobile-based vehicle inspection system operates in conjunction with a portable data device acquiring a continuous sequence of exterior images of a vehicle while the device is moved relative to the vehicle, together with motion data from an integrated inertial measurement unit. The application generates a three-dimensional geometric representation of at least a portion of the vehicle based on the image data and motion data. When manufacturer reference information is available, the geometric representation is analyzed relative to manufacturer-provided data to identify geometric deviations indicative of deformation, misalignment, or non-standard parts. When manufacturer reference information is unavailable, the geometric representation is analyzed to identify structural anomalies based on internal geometric relationships. On-board diagnostic data received from the vehicle is evaluated in relation to the geometric analysis to corroborate, complement, or supplement detected conditions. A diagnostic assessment indicative of a physical condition of the vehicle is generated.

26 Claims, 15 Drawing Sheets

(51) Int. Cl.

| | |
|---|---|
| ***G06T 7/73*** | (2017.01) |
| ***G06T 15/20*** | (2011.01) |
| ***G07C 5/02*** | (2006.01) |
| ***G07C 5/08*** | (2006.01) |

(52) U.S. Cl.

CPC ............. *G07C 5/02* (2013.01); *G07C 5/0808* (2013.01); *G06T 2207/10016* (2013.01); *G06T 2207/10028* (2013.01); *G06T 2207/30244* (2013.01); *G06T 2210/56* (2013.01)

(56) References Cited

U.S. PATENT DOCUMENTS

| | | | | |
|---|---|---|---|---|
| 11,455,841 | B1 | 9/2022 | Brunda | |
| 11,625,962 | B2 | 4/2023 | Brunda | |
| 12,480,836 | B2 | 11/2025 | Andreasen | |
| 12,586,292 | B1 * | 3/2026 | Gallo | G06T 7/50 |
| 12,597,115 | B2 * | 4/2026 | Brighton | G06T 7/0004 |
| 2013/0246135 | A1 | 9/2013 | Wang | |
| 2021/0304523 | A1 * | 9/2021 | Tanada | G07C 5/008 |
| 2021/0342999 | A1 * | 11/2021 | Xu | G06V 10/82 |
| 2022/0245781 | A1 * | 8/2022 | Nussbaum | G06Q 40/08 |
| 2023/0100483 | A1 * | 3/2023 | Knuffman | G06T 7/0004 701/31.4 |
| 2023/0206942 | A1 * | 6/2023 | Schneider | G01M 17/007 704/200 |
| 2025/0029434 | A1 * | 1/2025 | Birgiolas | G06N 3/0464 |
| 2025/0273026 | A1 | 8/2025 | Huynh | |
| 2025/0381982 | A1 * | 12/2025 | Lotan | B60W 60/001 |
| 2025/0390806 | A1 * | 12/2025 | Barole | B61L 23/041 |
| 2026/0087611 | A1 * | 3/2026 | Brighton | G06T 7/0008 |

* cited by examiner

Smartphone-Based Vehicle Inspection System - Component Availability

| Component | Category | Description/ Use in System | Example Smartphones/ Devices |
|---|---|---|---|
| High-resolution RGB Camera | Available on Most Smartphones | Captures exterior images and continuous video for photogrammetry, surface analysis, and defect detection. | iPhone 13+, Samsung Galaxy S21+, Google Pixel 6+ |
| Inertial Measurement Unit (IMU) | Available on Most Smartphones | Provides orientation, motion, and pose data for visual-inertial odometry and 3D reconstruction. | All modern iOS and Android smartphones |
| CPU / GPU / AI Accelerator | Available on Most Smartphones | Executes image processing, ML inference, geometry reconstruction, and diagnostic logic. | Apple A-series, Snapdragon 8-series, Google Tensor |
| LiDAR / Time-of-Flight Depth Sensor | Available on Some Smartphones | Improves depth accuracy and geometric reconstruction, especially on large panels. | iPhone 12 Pro+, iPhone 13 Pro+, iPad Pro |
| Multi-Camera Array (Wide/Ultra-Wide) | Available on Some Smartphones | Enhances feature matching, depth estimation, and coverage during walk-around scans. | Samsung Galaxy Ultra, Pixel Pro models |
| High-precision GNSS | Available on Some Smartphones | Provides coarse spatial context and metadata for scan sessions (optional). | iPhone Pro, Galaxy Ultra models |
| Magnetic Sensor | Secondary Component | Detects magnetic field variations indicating filler material, repainting, or non-OEM panels. | Bluetooth magnetic inspection probes |
| Ultrasonic Sensor | Secondary Component | Measures echo timing to detect dents, gaps, or paint thickness variation. | Handheld ultrasonic thickness gauges |
| Infrared / Thermal Sensor | Secondary Component | Detects thermal inconsistencies revealing repaired or material-mismatched areas. | FLIR One, compact IR camera modules |

FIG. 2

Sensor and Data Source Mapping

| Sensor / Data Source | Data Type Captured | Example Parameters | Analytical Purpose | Optional / Required |
|---|---|---|---|---|
| Mobile Camera | Image frames | RGB images, timestamps | Surface inspection, 3D reconstruction | Required |
| IMU Motion | data | Acceleration, angular rate | Camera pose estimation | Required |
| Depth Sensor | Depth map | Point depth, range | Enhanced 3D reconstruction | Optional |
| Magnetic Sensor | Magnetic response | Field strength variation | Filler / repaint detection | Optional |
| Ultrasonic Sensor | Echo timing | Thickness, distance | Panel thickness anomalies | Optional |
| Infrared Sensor | Thermal signature | Temperature gradients | Material inconsistency detection | Optional |
| OBD Interface | Vehicle diagnostics | VIN, DTCs, PIDs | Electronic condition assessment | Optional |

FIG. 5

OBD Parameter Categories

| Category | Representative Parameters | Analytical Use |
|---|---|---|
| Vehicle Identification | VIN, ECU IDs | Vehicle identification and reference retrieval |
| Fault Information | DTCs, freeze frames | Fault history and event inference |
| Operational Data | RPM, speed, voltage | Operational health assessment |
| Mileage Data | Odometer values | Tampering and consistency checks |
| EV / Hybrid Data | SOC, SOH, cell voltage, temperature | Battery health analysis |

FIG. 6

AI Processing Stages

| AI Processing Stage | Input Data | Output Data | Example Techniques |
|---|---|---|---|
| Feature Extraction | Image frames | Visual features | ORB, SIFT, AKAZE |
| 3D Reconstruction | Images, IMU, depth | 3D mesh or point cloud | SLAM, multi-view geometry |
| Model Alignment | 3D models | Aligned models | ICP, registration algorithms |
| Deviation Analysis | Aligned models | Deviation maps | Geometric differencing |
| Classification & Scoring | Deviation data, sensor data | Damage / non-OEM findings | ML classifiers, heuristics |

FIG. 7

Report Content Overview

| Report Type | Primary Inputs | Example Contents | Technical Purpose |
|---|---|---|---|
| Initial Report | 3D scan, sensors | Deviation maps, structural findings | Baseline physical assessment |
| Diagnostic Report | OBD data, user inputs | DTCs, battery health | Electronic condition assessment |
| Comprehensive Report | All prior reports | Cost estimates, valuation | Integrated decision support |

FIG. 8

OEM Reference Data Utilization

| OEM Data Type | Used For | Analytical Effect |
|---|---|---|
| OEM 3D Models | Geometry alignment | Factory-anchored deviation detection |
| OEM Specifications | Tolerance comparison | Objective damage thresholds |
| OEM Parts Lists | Component verification | Non-OEM part detection |

FIG. 9

Auxiliary Sensor Examples

| Sensor Type | Detected Phenomenon | Corroborated Condition |
|---|---|---|
| Magnetic | Field variation | Body filler presence |
| Ultrasonic | Thickness variation | Panel repair or deformation |
| Infrared | Thermal inconsistency | Material mismatch |

FIG. 10

Fallback and Degradation Behavior

| Unavailable Input | Fallback Operation | Resulting Capability |
|---|---|---|
| OEM Model | Intra-model anomaly detection | Relative damage assessment |
| VIN | Manual YMME entry | Reference approximation |
| Aux Sensors | Camera-only analysis | Reduced confidence scoring |
| OBD Data | Physical-only inspection | Structural assessment only |

FIG. 11

VEHICLE INSPECTION - INITIAL OUTPUT REPORT

VEHICLE INSPECTION - INITIAL EXTERIOR CONDITION REPORT

INSPECTION ID: 2026-01-A173

DATE / TIME: JAN. 13, 2026, 14:32

INSPECTION MODE: EXTERIOR SCAN WITH IMAGE-BASED AND AUXILIARY SENSOR ANALYSIS

VEHICLE IDENTIFICATION:

. VIN: 1HGBH41JXMN109186

. YEAR / MAKE / MODEL: 2021 HONDA ACCORD

. ENGINE: 2.0L TURBO

DATA SOURCES UTILIZED:

. MOBILE DEVICE CAMERA (MULTI-VIEW EXTERIOR IMAGES)

. INERTIAL MEASUREMENT UNIT (POSE ESTIMATION)

. DEPTH SENSOR (WHERE AVAILABLE)

. AUXILIARY SENSORS: MAGNETIC AND ULTRASONIC

. MANUFACTURER REFERENCE DATA: OEM 3D BODY MODEL AND DIMENSIONAL SPECIFICATIONS

---

1. RECONSTRUCTED VEHICLE MODEL

THE SYSTEM GENERATED A THREE-DIMENSIONAL EXTERIOR MODEL OF THE INSPECTED VEHICLE BASED ON CAPTURED IMAGE DATA AND ASSOCIATED MOTION DATA. THE RECONSTRUCTED MODEL INCLUDES THE FRONT FASCIA, HOOD, ROOFLINE, DOORS, QUARTER PANELS, AND REAR FASCIA. ALIGNMENT CONFIDENCE WITH THE MANUFACTURER REFERENCE COORDINATE SYSTEM WAS WITHIN EXPECTED THRESHOLDS FOR VALID COMPARISON.

A DEVIATION VISUALIZATION WAS GENERATED INDICATING LOCALIZED GEOMETRIC DIFFERENCES BETWEEN THE RECONSTRUCTED MODEL AND THE MANUFACTURER REFERENCE MODEL.

---

2. STRUCTURAL AND SURFACE FINDINGS

THE FOLLOWING PRELIMINARY FINDINGS WERE IDENTIFIED BASED ON EXTERIOR GEOMETRY AND SURFACE ANALYSIS:

. FRONT LEFT QUARTER PANEL:
LOCALIZED INWARD DEVIATION EXCEEDING MANUFACTURER TOLERANCE BY APPROXIMATELY 6.2 MM OVER A 120 MM REGION.

. FRONT BUMPER COVER:
SURFACE IRREGULARITIES CONSISTENT WITH DEFORMATION OR REPLACEMENT; TEXTURE ANALYSIS INDICATES NON-UNIFORM REFLECTIVITY RELATIVE TO ADJACENT PANELS.

. HOOD PANEL:
NO SIGNIFICANT DEVIATION DETECTED; GEOMETRY WITHIN EXPECTED TOLERANCE RANGE.

FIG. 12A

. DRIVER-SIDE DOOR:
MAGNETIC SENSOR RESPONSE INDICATES LOCALIZED VARIATION CONSISTENT WITH FILLER MATERIAL BENEATH PAINT SURFACE.

. PASSENGER-SIDE PANELS:
NO ANOMALOUS DEVIATIONS DETECTED.

---

3. COMPONENT AUTHENTICITY INDICATORS

BASED ON GEOMETRIC ALIGNMENT, SURFACE TEXTURE ANALYSIS, AND AUXILIARY SENSOR INPUT, THE SYSTEM IDENTIFIED THE FOLLOWING PRELIMINARY COMPONENT INDICATORS:

. FRONT BUMPER COVER: POSSIBLE NON-OEM OR REPLACEMENT COMPONENT
. FRONT LEFT QUARTER PANEL: EVIDENCE CONSISTENT WITH PRIOR REPAIR ACTIVITY
. REMAINING EXTERIOR PANELS: NO INDICATORS OF NON-ORIGINAL COMPONENTS DETECTED

---

4. CONFIDENCE ASSESSMENT

THE SYSTEM ASSIGNED CONFIDENCE SCORES TO EACH IDENTIFIED CONDITION BASED ON AGREEMENT AMONG IMAGE-BASED GEOMETRY, AUXILIARY SENSOR DATA, AND MANUFACTURER REFERENCE TOLERANCES:

. FRONT LEFT QUARTER PANEL DEVIATION: HIGH CONFIDENCE
. FRONT BUMPER COVER ANOMALY: MODERATE CONFIDENCE
. DRIVER-SIDE DOOR FILLER INDICATION: MODERATE CONFIDENCE

CONFIDENCE SCORES MAY BE UPDATED FOLLOWING CORRELATION WITH VEHICLE DIAGNOSTIC DATA IN SUBSEQUENT ANALYSIS STAGES.

---

5. SCOPE AND LIMITATIONS OF INITIAL REPORT

THIS INITIAL REPORT REFLECTS FINDINGS DERIVED FROM EXTERIOR INSPECTION DATA AND ASSOCIATED SENSOR ANALYSIS ONLY. VEHICLE DIAGNOSTIC DATA OBTAINED VIA ON-BOARD DIAGNOSTICS, SERVICE CONDITION INPUTS, AND VALUATION ANALYSIS HAVE NOT YET BEEN INCORPORATED. THE FINDINGS PRESENTED HEREIN REPRESENT A BASELINE PHYSICAL CONDITION ASSESSMENT AND ARE INTENDED TO BE SUPPLEMENTED BY SUBSEQUENT DIAGNOSTIC AND COMPREHENSIVE REPORTS.

---

END OF INITIAL REPORT

---

FIG. 12B

VEHICLE INSPECTION - FINAL COMPREHENSIVE CONDITION REPORT

INSPECTION ID: 2026-01-A173
DATE / TIME: JAN. 13, 2026, 15:11

VEHICLE IDENTIFICATION:
. VIN: 1HGBH41JXMN109186
. YEAR / MAKE / MODEL: 2021 HONDA ACCORD
. ENGINE: 2.0L TURBO
. MILEAGE: 42,118

---

1. REPORT OVERVIEW

THIS FINAL COMPREHENSIVE REPORT INCORPORATES AND BUILDS UPON THE INITIAL EXTERIOR CONDITION REPORT GENERATED DURING THE EXTERIOR INSPECTION STAGE AND SUBSEQUENT VEHICLE DIAGNOSTIC ANALYSIS. FINDINGS DERIVED FROM IMAGE-BASED RECONSTRUCTION, AUXILIARY SENSOR DATA, AND MANUFACTURER REFERENCE DATA HAVE BEEN CORRELATED WITH ON-BOARD DIAGNOSTIC INFORMATION AND SERVICE CONDITION INPUTS TO PRODUCE A CONSOLIDATED ASSESSMENT OF VEHICLE CONDITION.

---

2. SUMMARY OF INITIAL EXTERIOR FINDINGS

THE FOLLOWING FINDINGS WERE IDENTIFIED DURING THE INITIAL EXTERIOR INSPECTION STAGE, PRIOR TO INGESTION OF DIAGNOSTIC DATA:

. FRONT LEFT QUARTER PANEL EXHIBITED A LOCALIZED INWARD GEOMETRIC DEVIATION OF APPROXIMATELY 6.2 MM OVER A REGION OF APPROXIMATELY 120 MM, EXCEEDING MANUFACTURER TOLERANCE.
. FRONT BUMPER COVER EXHIBITED SURFACE AND GEOMETRIC CHARACTERISTICS CONSISTENT WITH A NON-ORIGINAL OR REPLACEMENT COMPONENT.
. DRIVER-SIDE DOOR EXHIBITED MAGNETIC SENSOR RESPONSE CONSISTENT WITH SUBSURFACE FILLER MATERIAL.
. HOOD PANEL AND PASSENGER-SIDE EXTERIOR PANELS WERE WITHIN EXPECTED GEOMETRIC TOLERANCES.

---

3. DIAGNOSTIC DATA ACQUISITION AND ANALYSIS

VEHICLE DIAGNOSTIC DATA WAS RETRIEVED VIA AN ON-BOARD DIAGNOSTIC INTERFACE AND INCLUDED DIAGNOSTIC TROUBLE CODES, FREEZE FRAME DATA, LIVE OPERATIONAL PARAMETERS, ODOMETER VALUES OBTAINED FROM MULTIPLE CONTROL MODULES, AND BATTERY AND VOLTAGE DATA.

NO ACTIVE POWERTRAIN DIAGNOSTIC TROUBLE CODES WERE DETECTED. A HISTORICAL BODY CONTROL MODULE EVENT WAS IDENTIFIED AND ASSOCIATED FREEZE FRAME DATA INDICATED A TIMING CONSISTENT WITH A PRIOR FRONT-END IMPACT EVENT. ODOMETER VALUES WERE CONSISTENT ACROSS CONTROL MODULES, AND NO EVIDENCE OF ODOMETER TAMPERING WAS DETECTED. SYSTEM VOLTAGE AND BATTERY CONDITION PARAMETERS WERE WITHIN NORMAL OPERATING RANGES.

FIG. 13A

4. CORRELATED FINDINGS AND INFERENCE

DIAGNOSTIC FINDINGS WERE CORRELATED WITH THE INITIAL EXTERIOR INSPECTION FINDINGS TO REFINE CONFIDENCE AND INTERPRETATION. THE BODY CONTROL MODULE EVENT AND FREEZE FRAME TIMING WERE CONSISTENT WITH THE LOCATION AND NATURE OF THE STRUCTURAL DEVIATION IDENTIFIED IN THE FRONT LEFT QUARTER PANEL. NO AIRBAG DEPLOYMENT EVENTS WERE DETECTED, SUGGESTING PRIOR COLLISION REPAIR WITHOUT SEVERE FRAME DAMAGE.

CORRELATION OF ELECTRONIC DIAGNOSTIC DATA WITH PHYSICAL GEOMETRY INCREASED CONFIDENCE IN THE ASSESSMENT OF PRIOR REPAIR ACTIVITY AFFECTING THE FRONT LEFT QUARTER PANEL AND ASSOCIATED EXTERIOR COMPONENTS.

5. UPDATED CONDITION ASSESSMENT

BASED ON COMBINED EXTERIOR INSPECTION DATA AND DIAGNOSTIC ANALYSIS, THE SYSTEM GENERATED THE FOLLOWING UPDATED ASSESSMENTS:

. FRONT LEFT QUARTER PANEL: PRIOR COLLISION DAMAGE WITH CONFIRMED REPAIR ACTIVITY; STRUCTURAL DEVIATION REMAINS PRESENT (HIGH CONFIDENCE).
. FRONT BUMPER COVER: NON-OEM REPLACEMENT COMPONENT LIKELY; COSMETIC IN NATURE (MODERATE TO HIGH CONFIDENCE).
. DRIVER-SIDE DOOR: COSMETIC FILLER MATERIAL PRESENT; NO STRUCTURAL IMPLICATIONS DETECTED (MODERATE CONFIDENCE).

6. REPAIR COST ESTIMATION

ESTIMATED REPAIR COSTS WERE GENERATED BASED ON MANUFACTURER PART PRICING DATA, REGIONAL LABOR RATES, AND THE SCOPE OF CONFIRMED STRUCTURAL AND COSMETIC FINDINGS:

. FRONT LEFT QUARTER PANEL REPAIR: APPROXIMATELY $1,850-$2,400
. FRONT BUMPER COVER REPLACEMENT: APPROXIMATELY $650-$1,100
. DRIVER-SIDE DOOR COSMETIC REPAIR: APPROXIMATELY $400-$700

ESTIMATED TOTAL REPAIR COST RANGE: APPROXIMATELY $2,900-$4,200.

7. VEHICLE VALUATION IMPACT

MARKET VALUATION WAS COMPUTED USING COMPARABLE VEHICLE DATA AND ADJUSTED TO ACCOUNT FOR CONFIRMED REPAIR HISTORY AND CURRENT VEHICLE CONDITION.

. ESTIMATED MARKET VALUE (AS-IS): APPROXIMATELY $18,400-$19,100
. ESTIMATED MARKET VALUE (REPAIRED): APPROXIMATELY $20,100-$20,800

FIG. 13B

8. FINAL CONFIDENCE ASSESSMENT

OVERALL ASSESSMENT CONFIDENCE WAS DETERMINED BASED ON AGREEMENT AMONG IMAGE-BASED GEOMETRIC ANALYSIS, AUXILIARY SENSOR DATA, VEHICLE DIAGNOSTIC DATA, AND MANUFACTURER REFERENCE TOLERANCES. THE FINAL ASSESSMENT CONFIDENCE FOR THE VEHICLE CONDITION DESCRIBED HEREIN IS HIGH.

END OF FINAL COMPREHENSIVE REPORT

FIG. 13C

Example Diagnostic Trouble Code (DTC) Categories and Collision Corroboration Value

| DTC Category | Representative Examples (Non-Limiting) | Benefit for Collision Corroboration |
|---|---|---|
| Sensor Plausibility / Correlation | Airflow vs. throttle plausibility, temperature correlation, wheel speed correlation | May indicate bent mounts, shifted components, airflow obstruction, or sensor misalignment caused by collision damage or poor repair. |
| Inter-Module Communication / Network | Lost communication with module, intermittent CAN messages | May reflect damaged wiring, grounding issues, connector strain, or module replacement following collision or repair. |
| Calibration / Configuration Mismatch | Calibration ID mismatch, variant coding errors | Strong indicator of non-OEM parts, improper module replacement, salvage repairs, or incomplete post-collision programming. |
| Control Authority / Compensation Limits | Cooling fan duty cycle limit, fuel trim limit, torque management limits | May indicate compensatory behavior due to altered airflow, cooling path disruption, or structural deformation. |
| Chassis / Stability / Alignment | Steering angle plausibility, yaw rate mismatch, suspension sensor faults | Often consistent with frame damage, misalignment, suspension damage, or low-quality structural repair. |
| Historical / Transient Fault Records | Stored or cleared DTC history, freeze-frame snapshots | May provide evidence of prior collision or repair events even when no active faults are present. |

FIG. 14

AUTO REPAIR ESTIMATE

Vehicle Information

VIN: *1HGBH41JXMN109186*
Tear/Make/Model: *2020 Honda Accord*
Mileage: 45,230 miles
Assessment ID: 10245

*Deformation Detected*

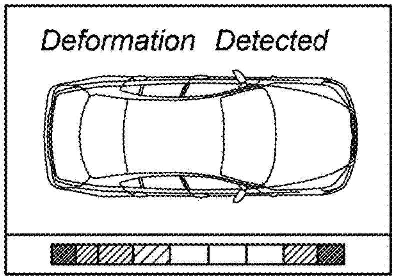

Repair Estimate

| DESCRIPTION | PARTS | LABOR | COST |
| --- | --- | --- | --- |
| *Replace Front Bumper Reinforcement* | | | |
| *OEM Bumper Reinforcement* | *$150.00* | *2.5 hrs* | *$275.00* |
| *Realign Left Fender* | | | |
| *Fasteners & Alignment* | *$25.00* | *1.5 hrs* | *$85.00* |
| *Repaint Hood Panel* | | | |
| *Paint & Materials* | *$100.00* | *3.0 hrs* | *$300.00* |

*Diagnostic Correlation Summary*

- *Minor Impact Event Logged*
- *Airbag Sensor Data Normal*
- *Steering Angle Offset detected*

| | |
| --- | --- |
| *Subtotal:* | *$660.00* |
| *Taxes & Fees:* | *$45.00* |
| *Estimated Total:* | **$705.00** |

FIG. 15

SYSTEM AND METHOD FOR VEHICLE CONDITION ASSESSMENT USING CORRELATED THREE-DIMENSIONAL GEOMETRIC ANALYSIS AND ON-BOARD DIAGNOSTIC DATA

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to systems and methods for automated vehicle inspection and diagnostics. The disclosure relates more particularly to a mobile-based system that combines on-board diagnostic (OBD) data, sensor-derived or image-based condition data, and deep learning analysis to assess vehicle condition, detect faults, and identify probable fault causes through fused data interpretation.

2. Description of the Related Art

Vehicles, such as cars or trucks, have values that vary over time. A vehicle's value follows a well-defined economic trajectory throughout its lifespan, beginning at the point of manufacture and continuing through resale, secondary use, and eventual disposal. When a new vehicle is first introduced to the market, its price is established by the manufacturer and dealer network based on production cost, brand positioning, model demand, and prevailing market conditions. This dealer price represents the vehicle's initial market value and includes margins for distribution, sales incentives, and warranty coverage. At this stage, valuation is largely theoretical and uniform across identical models, reflecting specification rather than individual condition.

Once the vehicle is sold and driven off the dealer lot, it immediately undergoes its first and most significant drop in value, commonly referred to as first-year depreciation. This early decline reflects the transition from new to used status and the corresponding reduction in perceived reliability, warranty coverage, and resale desirability. During the first several years of ownership, a vehicle's value continues to decline steadily, influenced by mileage accumulation, wear and tear, maintenance history, and shifting market demand. Manufacturers and analysts often model this stage using standardized depreciation curves derived from historical sales data and economic trends.

As the vehicle ages, mechanical condition and maintenance quality become primary drivers of value. Service records, accident history, and environmental exposure begin to differentiate vehicles of the same make and model. During this midlife phase, valuation depends heavily on vehicle condition assessment, which includes its exterior condition, its internal condition, verified odometer readings, and, more recently, a presence or absence of diagnostic trouble codes retrieved from a vehicle's OBD system.

On-board diagnostics is a standardized system that allows electronic monitoring and external access to a vehicle's internal operational data. First introduced in the 1980s and formalized as OBD-II in the mid-1990s, it enables real-time communication between a vehicle's electronic control units (ECUs) and external diagnostic tools through a standardized diagnostic link connector (DLC). ECUs are embedded microcontrollers that govern and monitor various subsystems such as the engine, transmission, braking, and emissions systems. Each ECU collects sensor inputs and executes control algorithms to maintain optimal system performance. OBD aggregates this information across subsystems, creating a unified diagnostic channel.

A central feature of OBD is its ability to record and report diagnostic trouble codes (DTCs), standardized alphanumeric identifiers that indicate specific malfunctions or irregularities within vehicle systems. When a monitored parameter exceeds a predefined threshold, the corresponding ECU logs a DTC and, in many cases, triggers the malfunction indicator lamp (MIL) on the dashboard. DTCs are categorized by subsystem, such as powertrain ("P" codes), chassis ("C" codes), body ("B" codes), and network communication ("U" codes). These codes allow technicians and diagnostic tools to identify the source of a fault without disassembling the system, enabling efficient troubleshooting and repair.

Beyond static fault codes, OBD provides access to live data, also known as parameter identification data (PIDs). Live data streams represent continuously updated readings from sensors and actuators, including variables such as engine RPM, throttle position, fuel trim, coolant temperature, manifold pressure, oxygen sensor voltage, and vehicle speed. This real-time information allows evaluators to observe system behavior dynamically, facilitating performance assessment, emissions testing, and predictive analysis.

Together, ECUs, DTCs, and live data form the diagnostic foundation of modern vehicles. The OBD system thus functions as an intelligent interface between a vehicle's internal control network and external diagnostic or analytic devices, providing comprehensive insight into mechanical, electrical, and emissions-related performance through standardized communication protocols.

A vehicle condition may diverge significantly at its mid-life time period, even among units of similar age, and appraisers or automated systems consider both electronic health indicators and exterior condition when determining residual value.

In the later years of ownership, as repair frequency and cost increase relative to market value, vehicles typically enter the secondary or wholesale market, where pricing is determined by auction results, trade-in valuations, or fleet decommissioning models. Vehicles in this stage often serve as affordable transportation, fleet assets, or export inventory, with valuation strongly influenced by functional reliability, emissions compliance, and local market demand. Once repair costs or safety issues exceed residual worth, vehicles are commonly sold to dismantlers or recyclers.

At the end of the lifecycle, the vehicle's scrap value is determined by the recoverable worth of its constituent materials and parts rather than by operability. Valuation at this stage depends on commodity prices for steel, aluminum, copper, and catalytic materials, as well as salvageable components such as engines, transmissions, and electronic modules. The vehicle's identity as an operational product effectively ceases, and its value reverts to material composition.

From initial dealer pricing to final salvage, a vehicle's condition assessment and valuation thus evolves from a standardized retail figure to a condition-based and eventually material-based assessment. Each stage introduces new variables, usage, wear, diagnostic health, and structural integrity, that collectively define the economic life of the vehicle and the quantitative representation of its remaining worth.

Vehicle condition assessment and valuation serve a broad range of commercial, financial, and administrative purposes throughout the automotive industry and related sectors. In retail and private sale contexts, valuation establishes the fair market price of a vehicle based on its condition, mileage, and demand, guiding negotiation between buyers and sellers and supporting transparent transactions. Within dealership operations, valuation is used to determine trade-in allowances, wholesale auction pricing, and inventory acquisition costs, as well as to inform reconditioning decisions where the cost of repair is weighed against potential resale value. In the insurance field, accurate valuation underpins underwriting, loss adjustment, and claim settlement, providing the basis for determining replacement cost, depreciation, and total-loss compensation. Financial institutions rely on valuation for loan underwriting, collateral assessment, and lease residual projections, while fleet operators employ it for lifecycle management, predictive maintenance, and cost optimization.

Governmental and legal bodies use valuation for taxation, customs, estate, and asset forfeiture proceedings, ensuring consistent assessment of a vehicle's monetary worth in regulatory and judicial settings. In the secondary and remarketing sectors, valuation determines whether a vehicle is suited for resale, export, refurbishment, or salvage. It also supports residual value analytics used by manufacturers and market analysts to model depreciation trends and inform production and leasing strategies. For individual consumers, valuation enables personal asset tracking, helps identify optimal times to sell or trade, and quantifies the return on major maintenance or modification expenditures.

Emerging data-driven markets have further expanded the role of vehicle valuation. In connected and autonomous vehicle ecosystems, valuation may occur automatically during asset exchanges or digital marketplace transactions. Subscription and mobility services increasingly depend on condition-based valuation to adjust usage pricing in real time, while sustainability frameworks use valuation data to calculate retained value and embodied carbon metrics across fleets. In some implementations, verified valuation information may be integrated into blockchain or smart-contract systems to automate ownership transfer and escrow release. Collectively, vehicle valuation now functions as a multidimensional reference that influences decision-making in commerce, finance, insurance, government, and mobility infrastructure, reflecting not only a vehicle's historical worth but also its present condition and predictive operational value.

Present-day vehicle valuation systems face significant costs, inefficiencies, and risks due to their fragmented structure and incomplete use of available data. Modern appraisals typically combine static market databases, limited photographic inspection, and historical transaction records. However, these inputs are analyzed independently, without integration of live diagnostic or condition-based data from the vehicle itself. This lack of cohesion leads to systemic inefficiency, as evaluators must reconcile incomplete or inconsistent datasets, often requiring manual correction or human inspection to confirm values.

From a cost perspective, these inefficiencies translate into measurable financial losses. Dealers and remarketing platforms incur overhead through repetitive appraisals, mispriced acquisitions, and inventory stagnation caused by inaccurate pricing models. Insurers and lenders face inflated claim costs or collateral shortfalls when valuations fail to match actual mechanical condition. Fleets and leasing companies may retire vehicles prematurely or hold them beyond optimal replacement cycles because book values fail to reflect real-time wear, performance, or reliability data.

There are also technological and structural risks. Current systems rely heavily on legacy data sources that cannot capture sudden condition changes such as new mechanical faults or structural damage. Omission of OBD-derived diagnostic information and sensor-based surface assessment leads to latent risk exposure. Vehicles may appear sound in photographs but harbor internal issues detectable only through ECU-level fault codes or live parameter data. Moreover, lack of standardization across valuation platforms means that similar vehicles can produce divergent appraisals, undermining transparency and eroding consumer trust.

In the broader economic context, these shortcomings propagate through the automotive value chain. Inaccurate valuations distort secondary market pricing, complicate tax and insurance assessments, and weaken residual value predictions that underpin leasing and fleet management. At scale, these systemic inaccuracies contribute to billions in misallocated capital and inefficiency across industries dependent on automotive asset valuation.

A core risk is not only error but inertia: current valuation frameworks remain tied to historical averages and static datasets, while vehicles themselves have become dynamic, sensor-rich systems generating continuous streams of diagnostic, operational, and environmental data. The failure to integrate that live information into valuation processes perpetuates inefficiency, elevates financial risk, and prevents accurate reflection of true, real-time asset value.

Inaccurate vehicle valuation can have wide-ranging financial, operational, and legal consequences across nearly every sector that relies on automotive value as a decision metric. At the most basic level, incorrect appraisals distort market efficiency, leading to vehicles being overvalued or undervalued relative to their true condition. Overvaluation exposes buyers, lenders, and insurers to financial loss when the vehicle later depreciates faster than predicted or proves mechanically unsound. Conversely, undervaluation erodes asset equity, reduces collateral potential, and can result in unfairly low trade-in or insurance settlement amounts.

From a financial standpoint, lenders who base loan amounts on inflated values face elevated default and repossession risk, while insurers who underestimate pre-loss value may face disputes, litigation, or reputational harm. Dealers risk profit erosion from mispriced inventory, either through excess carrying costs on vehicles priced too high to sell or through margin losses on undervalued trade-ins. Fleets and leasing companies suffer inaccurate depreciation schedules, distorting balance sheets and tax planning.

Operationally, unreliable valuation disrupts maintenance, replacement, and investment planning. Fleets may retain aging assets too long if their book values appear inflated, increasing downtime and maintenance costs. Insurers and appraisers face increased workload due to reappraisals and claims disputes, while online platforms risk customer attrition when automated valuations fail to align with observed condition or market outcomes.

Legal and compliance risks also arise. Tax assessments, insurance payouts, and collateral valuations all depend on documented fairness and traceability. Inaccurate valuation can lead to allegations of negligence, regulatory penalties, or contractual breach. In cross-border contexts, undervaluation of imports or exports may trigger customs violations or audit actions.

There are also societal and consumer-level costs. Individual owners may make misinformed financial decisions, retaining, selling, or insuring vehicles at economically disadvantageous times. Inconsistent valuations across jurisdictions reduce transparency and erode trust in digital marketplaces. Finally, inaccurate valuation hinders sustainability efforts by masking the true lifecycle efficiency of vehicles, skewing decisions on repair versus replacement.

In total, valuation inaccuracy introduces compounding risks across financial, operational, and legal domains. These risks grow as vehicles incorporate more electronic, diagnostic, and condition-based data that traditional valuation methods fail to capture, creating a widening gap between perceived and actual asset value.

BRIEF SUMMARY

Example embodiments relate to systems, methods, and computer-readable storage media for assessing a physical condition of a vehicle using a combination of image-based geometric analysis, motion sensing, and on-board diagnostic information. In example embodiments, a vehicle inspection system includes a portable data device having one or more processors, associated memory, an integrated camera, an integrated inertial measurement unit, and a network interface. The portable data device executes a vehicle inspection application that cooperates with a wireless on-board diagnostic interface communicatively coupled to a diagnostic link connector of a vehicle and with one or more remote databases and computing services.

In operation, the portable data device acquires a continuous sequence of exterior images of a vehicle while the portable data device is moved relative to the vehicle, such that the exterior images are captured from multiple viewpoints. Concurrently, the portable data device receives motion data from the integrated inertial measurement unit, the motion data corresponding to movement of the portable data device during image capture. Vehicle identification data identifying the vehicle is also received, and on-board diagnostic data is received from the vehicle via the wireless diagnostic interface. Using the network interface, the portable data device requests manufacturer reference information corresponding to the identified vehicle from a manufacturer database and processes any manufacturer reference information returned in response to the request.

Based on the received image data and motion data, the portable data device generates a three-dimensional geometric representation of at least a portion of the vehicle. In some embodiments, generating the three-dimensional geometric representation includes estimating a plurality of camera poses corresponding to the exterior images based on the motion data and visual feature correspondence between successive images, combining geometric information derived from the exterior images based on the estimated camera poses to form a spatially consistent representation of the vehicle exterior, reconstructing a three-dimensional point cloud representing the vehicle exterior using multi-view geometric reconstruction, and forming a surface representation from the point cloud to define the three-dimensional geometric representation used for subsequent analysis.

When manufacturer reference information for the vehicle is received, the three-dimensional geometric representation is analyzed relative to manufacturer-provided geometric data to identify geometric deviations indicative of physical deformation, misalignment, or non-standard parts. In some embodiments, this analysis includes aligning the manufacturer-provided geometric data with the three-dimensional geometric representation by normalizing the manufacturer-provided data into a coordinate space defined by the three-dimensional geometric representation using one or more scaling, translation, rotation, or reference-plane adjustments, such that deviations are identified based on spatial correspondence rather than nominal dimensional values.

When manufacturer reference information for the vehicle is unavailable, the three-dimensional geometric representation is analyzed to identify structural anomalies based on internal geometric relationships. In some embodiments, identifying structural anomalies includes performing symmetry-based comparisons between corresponding regions of the vehicle exterior, evaluating geometric consistency across adjacent or related exterior regions, or applying learned baseline models derived from geometric characteristics of similar vehicles or from intra-vehicle geometric relationships.

The received on-board diagnostic data is evaluated in relation to results of the geometric analysis to corroborate, complement, or supplement detected geometric deviations or structural anomalies. In some embodiments, evaluating the on-board diagnostic data includes associating detected geometric deviations or structural anomalies with electronic vehicle indicators derived from the on-board diagnostic data, including diagnostic trouble codes, electronic control unit status information, event-related data, or vehicle usage data. The associated diagnostic information may be used to influence confidence, weighting, or interpretation of the detected geometric conditions.

A diagnostic assessment indicative of a physical condition of the vehicle is generated based at least in part on the evaluation of the on-board diagnostic data in relation to results of the geometric analysis. The diagnostic assessment may characterize the presence, absence, or likelihood of physical deformation, misalignment, structural irregularities, or non-standard vehicle components.

In example embodiments, at least a portion of generating the three-dimensional geometric representation or performing the geometric analysis is executed on the portable data device. In other embodiments, at least a portion of the generation or analysis is executed on a remote cloud computing service accessed via the network interface. In further embodiments, the generation and analysis are performed cooperatively by the portable data device and the remote cloud computing service, with different processing tasks distributed between local and remote computing resources.

The functionality described above may be implemented as an apparatus comprising the portable data device, the wireless diagnostic interface, and associated processing components; as a method comprising steps performed by the portable data device and associated computing resources; or as a non-transitory computer-readable storage medium storing instructions that, when executed by one or more processors of a portable data device, cause the portable data device to perform the described operations. In some embodiments, the portable data device comprises a smartphone or a tablet computer.

BRIEF DESCRIPTION OF THE DRAWINGS

These and other features and advantages of the various embodiments disclosed herein will be better understood with respect to the following description and drawings, in which:

FIG. 2 is a table illustrating representative hardware and functional components usable in a mobile-based vehicle inspection and diagnostic system;

FIG. 5 illustrates representative sensors and data sources that may be used by a multi-domain vehicle condition system, along with the types of data captured and their analytical purposes;

FIG. 6 illustrates categories of vehicle diagnostic parameters that are suitably7 retrieved via an on-board diagnostic interface for use by a multi-domain vehicle condition system;

Figure 1:
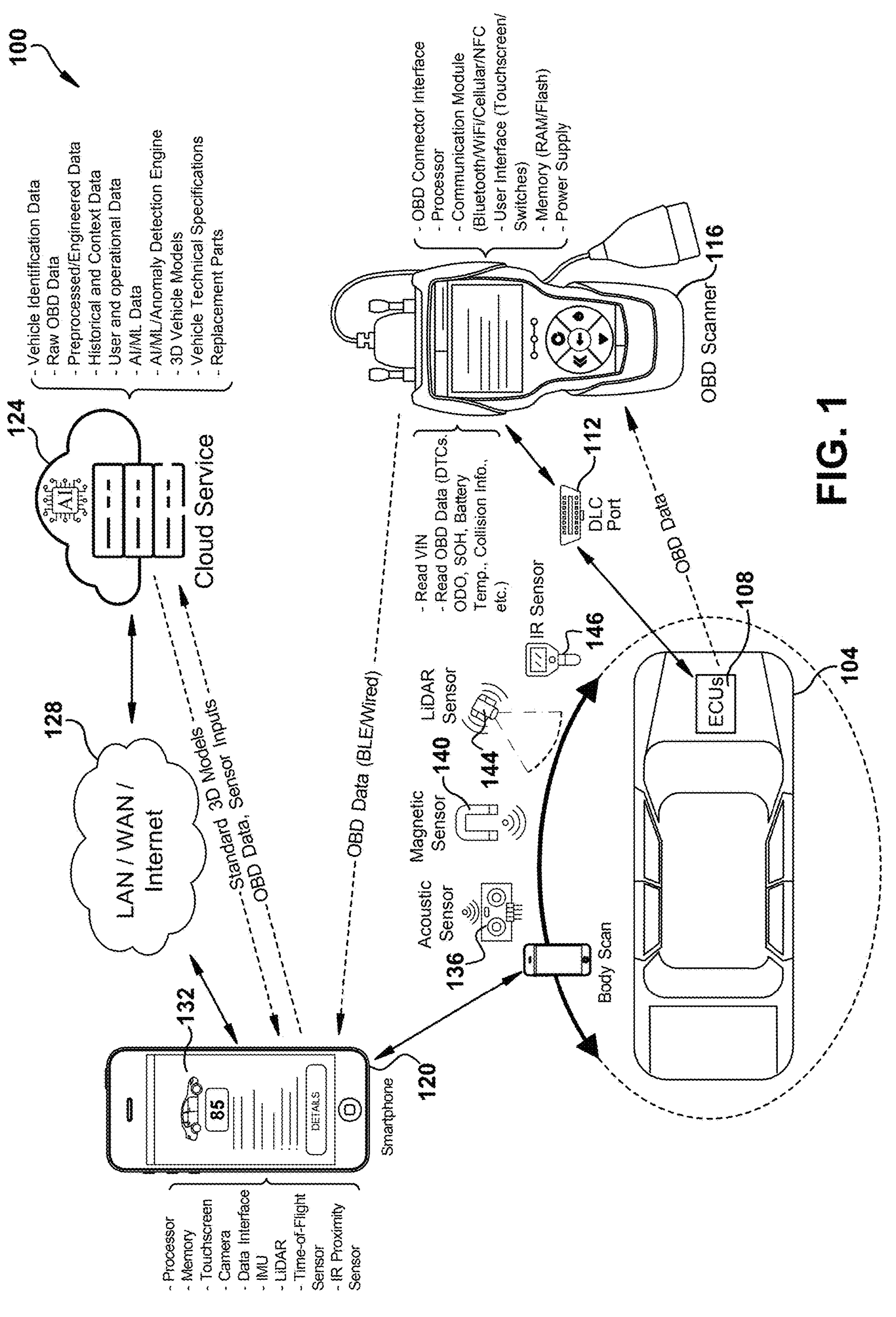
FIG. 1 illustrates an example embodiment of a system for multi-domain vehicle condition assessment via OBD data and sensor-based deep learning classification.

FIG. 7 illustrates representative artificial intelligence processing stages suitably employed by a multi-domain vehicle condition system;

FIG. 8 illustrates an example embodiment of staged reporting structure generated by a multi-domain vehicle condition system;

FIG. 9 illustrates representative types of manufacturer reference data and how such data is suitably utilized by a multi-domain vehicle condition system;

FIG. 10 illustrates examples of auxiliary sensors that are suitably employed by a multi-domain vehicle condition system, and the types of physical phenomena they detect;

FIG. 11 illustrates representative fallback and degradation behaviors of a multi-domain vehicle condition system when certain inputs are unavailable;

FIGS. 12A and 12B show an example initial output report for a multi-domain vehicle condition system;

FIGS. 13A,13B and 13C show an example comprehensive output report as a follow-up to the initial output report of FIGS. 12A and 12B;

FIG. 14 is a table illustrating representative categories diagnostic trouble codes and associated diagnostic information that may be used by the system as secondary indicators for corroborating collision-related physical conditions; and FIG. 15 illustrates an example embodiment of a repair estimate or repair order formatted for use by a repair facility, insurer, vehicle dealer, or end user.

DETAILED DESCRIPTION

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Example embodiments herein employ multi-domain data acquisition for vehicle valuation. In this context, the term multi-domain refers to integration of data originating from several distinct categories, or domains, that collectively describe different aspects of a vehicle's condition and operation.

Conventional valuation and diagnostic systems typically analyze these domains in isolation, OBD scanners interpret internal mechanical data, appraisers assess visual condition, and external databases provide historical or transactional records. The subject multi-domain system, by contrast, fuses these separate information streams into a unified analytical framework. Through cross-domain correlation, the system can relate events detected in one domain to indicators found in another. For example, this is suitably accomplished by linking an OBD-reported misfire to vibration data from an accelerometer and a visible irregularity captured by an imaging sensor. This integrated approach produces a more accurate and comprehensive representation of a vehicle's true state and market value, as it reflects the combined mechanical, structural, and contextual factors influencing overall condition.

In example embodiments, the system connects to a vehicle's DLC via an OBD-compliant communication interface. Through this connection, the system retrieves vehicle identification and configuration data, including year, make, model, and engine (YMME) parameters derived from the Vehicle Identification Number (VIN). In certain implementations, the OBD data interface, such as via a scan tool or OBD dongle, automatically reads the VIN from the vehicle's control module memory. In instances where the VIN cannot be retrieved electronically, such as vehicles that do not support VIN broadcast or when scan tool communication fails, the user or technician may manually input the VIN or vehicle details through the mobile application interface. The VIN or vehicle information is then utilized to obtain the appropriate manufacturer reference data, including 3D model geometry and component configuration records.

Once the connection is established, the OBD data interface performs diagnostic interrogation of the vehicle's ECUs. The OBD data interface retrieves DTCs, live operational parameters, and system status data. For electric or hybrid vehicles, the module further acquires battery-related parameters, such as state of charge (SOC), state of health (SOH), individual cell voltages, temperature gradients, and balance conditions. This diagnostic information is transmitted to the application and suitably synchronized with a remote server database containing OEM reference specifications, calibration thresholds, and canonical 3D models. Comparative analysis between the retrieved diagnostic data and stored manufacturer data allows the system to detect mismatched configurations, missing or replaced components, and performance anomalies inconsistent with original specifications.

At substantially the same time, a technician or user employs their mobile application to perform an exterior inspection of the vehicle body. The system suitably uses the mobile device's built-in camera to acquire image sequences covering the entire vehicle exterior, optionally enhanced through data collected from auxiliary sensors such as depth sensors, magnetic field sensors, ultrasonic sensors, vibration sensors, or infrared sensors. The application combines these multimodal datasets to generate a three-dimensional (3D) reconstruction of the vehicle surface. An artificial intelligence (AI) reconstruction engine processes the imagery to produce a dense geometric mesh, which is subsequently aligned with a manufacturer-supplied reference model when avaialable. This alignment enables precise comparison to detect surface deformation, material inconsistencies, repainting, body filler application, or unauthorized part replacement.

In certain embodiments, the system employs one or more sensors to acquire data used for exterior geometric analysis, structural anomaly detection, and correlation with diagnostic information. The specific sensor types and implementations described herein are provided as illustrative, non-limiting examples to support enablement, and the invention is not restricted to any particular sensor manufacturer, model, or technology.

In some embodiments, magnetic sensing may be performed using Hall-effect magnetic sensors configured to detect magnetic field variations associated with vehicle components or structural features. Example Hall-effect sensor implementations include linear or three-axis magnetic sensors commercially available from suppliers such as Honeywell or Melexis. Such sensors may be used to detect the presence, position, or alignment of magnetic elements or to assist in identifying component displacement or non-standard installation.

In some embodiments, ultrasonic sensing may be performed using piezoelectric ultrasonic transducers configured to emit and receive ultrasonic signals for distance measurement, surface profiling, or defect detection. Example ultrasonic transducer implementations include piezoelectric ultrasonic sensors commercially available from suppliers such as Murata or MaxBotix. Ultrasonic sensing may be used to supplement image-based geometry by providing additional depth, thickness, or surface continuity information.

In some embodiments, infrared sensing may be performed using long-wave infrared (LWIR) thermal imaging modules configured to detect thermal radiation emitted from vehicle surfaces or components. Example LWIR imaging modules include compact thermal imaging sensors commercially available from suppliers such as FLIR or Melexis. Infrared sensing may be used to identify thermal anomalies, heat dissipation irregularities, or surface characteristics indicative of repainting, material differences, or non-standard components.

In some embodiments, the system may further include depth-sensing sensors, such as LiDAR or structured-light depth sensors, to provide additional three-dimensional spatial information. Example depth-sensing implementations include LiDAR sensors integrated into consumer mobile devices, depth cameras such as Intel RealSense modules, or time-of-flight sensing systems such as Azure Kinect. Depth-sensing data may be fused with image data and motion data to improve accuracy of three-dimensional reconstruction and anomaly detection.

The foregoing sensor implementations are provided solely as examples to demonstrate that suitable sensing technologies are commercially available and readily integrable into the disclosed system. The invention is not limited to these examples, and other magnetic, ultrasonic, infrared, depth-sensing, or multi-modal sensors—whether currently available or later developed—may be used without departing from the scope of the disclosure.

The system further provides functionality for connecting to external sensing modules via wired or wireless (e.g., Bluetooth) interfaces.

The mobile application performs continuous scanning while synchronizing positional data from the device's inertial measurement unit (IMU) and optional LiDAR depth sensors. The scan operates in real time at a frame rate suitably between approximately 30 and 60 frames per second, ensuring frame-to-frame overlap of at least 60 percent for geometric continuity. The acquired image sequence is processed through multiple stages including:

lens distortion correction, white-balance adjustment, and exposure normalization;

Artificial Intelligence (AI) feature extraction and pose estimation, optionally incorporating visual-inertial odometry (VIO) or simultaneous localization and mapping (SLAM) for improved spatial tracking;

dense 3D reconstruction using multi-view stereo (MVS) or depth refinement networks; and surface reconstruction and mesh optimization using Poisson or volumetric algorithms.

To enhance defect detection accuracy, the system suitably applies super-resolution and denoising techniques, such as ESRGAN, SRResNet, DnCNN, or BM3D, on selected regions of interest. The reconstructed mesh is then registered against the OEM reference geometry using an Iterative Closest Point (ICP) alignment procedure or bundle-based optimization, producing a deviation heatmap. The heatmap quantitatively highlights displacement regions exceeding a target mean error threshold (typically ≤2 mm), thus identifying structural or surface anomalies.

In certain embodiments, the vehicle inspection application generates a three-dimensional geometric representation of at least a portion of a vehicle by determining relative positions and orientations of a camera integrated into a portable data device during image capture. As the portable data device is moved relative to the vehicle while acquiring a continuous sequence of exterior images, motion data is concurrently received from an IMU integrated into the portable data device. The motion data is used, alone or in combination with visual feature correspondence between successive exterior images, to estimate a plurality of camera poses corresponding to respective image capture instances, each camera pose defining a spatial position and orientation of the camera relative to the vehicle.

The estimated camera poses establish a common spatial reference framework that enables geometric information derived from multiple exterior images to be combined into a spatially consistent three-dimensional representation of the vehicle exterior. In some embodiments, visual features detected in the exterior images are associated across multiple images captured from different viewpoints, and the estimated camera poses are used to triangulate three-dimensional locations of the associated features. The resulting geometric information may be represented as a three-dimensional point cloud, mesh, surface model, or other geometric representation suitable for subsequent analysis.

In embodiments utilizing motion data from the IMU, the motion data provides relative movement constraints between successive camera poses and is used to improve robustness, accuracy, or stability of the pose estimation, including by reducing ambiguity or drift that may arise from image-only reconstruction. The three-dimensional geometric representation generated using the estimated camera poses and associated image data provides a geometrically coherent model of the vehicle exterior that supports further analysis, including identification of geometric deviations relative to manufacturer reference information or identification of structural anomalies based on internal geometric relationships when manufacturer reference information is unavailable.

In further embodiments, the system performs defect-specific analysis, including:

detection of repainting by analyzing color variance and texture reflectance patterns;

detection of part disassembly or replacement by identifying changes in fastener alignment and torque-mark displacement; and correlation of detected anomalies with OBD-recorded crash or event timestamps to infer collision events or subsequent repair activities.

The system maintains a cloud-based 3D model database containing standardized vehicle geometries and component libraries for multiple manufacturers and production years. The database can be accessed remotely through secure communication channels or locally embedded within the mobile application for offline operation.

In certain embodiments, results of geometric analysis performed on a reconstructed three-dimensional representation of a vehicle exterior are correlated with vehicle diagnostic data obtained via an on-board diagnostics interface in order to increase confidence in detected conditions and to generate a unified diagnostic assessment. The vehicle diagnostic data may include, by way of example, DTCs, module status information, odometer values, sensor readings, and historical or event-related data associated with vehicle operation.

In one implementation, the system associates geometric findings with diagnostic trouble codes based on affected vehicle subsystems. For example, geometric deviations or structural anomalies identified in a region of the vehicle exterior corresponding to a particular structural or safety subsystem may be correlated with diagnostic trouble codes associated with airbag modules, crash sensors, restraint systems, steering angle sensors, or body control modules. When both geometric findings and related diagnostic indicators are present, the system increases a confidence measure associated with the detected condition.

In certain embodiments, the system correlates geometric findings with temporal information derived from vehicle diagnostic data. The system may evaluate timestamps, mileage readings, or historical diagnostic records to determine whether detected geometric conditions are consistent with recorded vehicle events, such as collision detections, airbag deployments, or abrupt deceleration events. When a detected geometric deviation or anomaly is consistent with the timing or mileage associated with a recorded event, the system identifies the condition as corroborated by electronic evidence.

In some embodiments, the system correlates geometric results with sensor-derived vehicle state data. For example, steering angle data, yaw rate data, acceleration data, or wheel speed data obtained from electronic control units may be evaluated to identify patterns indicative of prior impacts or abnormal vehicle dynamics. When such patterns correspond spatially or functionally to detected geometric irregularities, the system increases the likelihood that the geometric findings represent genuine structural conditions rather than superficial cosmetic variation.

In certain implementations, the system correlates geometric findings with odometer data and vehicle usage metrics to identify inconsistencies suggestive of undisclosed repairs or damage. For example, substantial geometric deviations or structural anomalies identified on a vehicle with relatively low recorded mileage may be weighted more heavily than similar findings on a high-mileage vehicle. Conversely, the absence of corresponding diagnostic indicators on a high-mileage vehicle may reduce confidence in certain geometric findings.

In some embodiments, the system employs a weighted correlation model in which geometric results and vehicle diagnostic data are each assigned respective confidence values. The system combines the confidence values using predefined rules or learned weighting functions to produce an overall diagnostic assessment. The weighting may account for factors such as the severity of geometric deviation, the number of corroborating diagnostic indicators, and the reliability of available diagnostic data.

In certain embodiments, correlation results are used to classify detected conditions into categories, such as confirmed structural condition, probable structural condition, or uncorroborated geometric irregularity. These classifications may be presented in an inspection report along with explanatory information describing which geometric findings and diagnostic indicators contributed to the classification.

Accordingly, by correlating results of geometric analysis with vehicle diagnostic data obtained through the on-board diagnostics interface, the system produces a diagnostic assessment that integrates physical exterior measurements with electronic vehicle state information. This integrated approach improves reliability of inspection results and reduces false positives by distinguishing between cosmetic variation and conditions supported by electronic evidence.

In one embodiment, the system is configured to identify vehicle conditions that are not determinable from a single inspection domain alone, but instead are indicated by correlation between exterior geometric characteristics of the vehicle and diagnostic parameter behavior obtained from on-board vehicle systems. As used herein, exterior geometric deviations refer to deviations, anomalies, or irregularities in exterior vehicle geometry identified through three-dimensional geometric analysis of captured image data, including deviations determined by comparison with manufacturer reference geometry or, when such reference geometry is unavailable, by internal mesh-based anomaly analysis.

Diagnostic parameter variations suitably refer to variations, trends, or values of parameters obtained from one or more vehicle control modules via an on-board diagnostic interface, including parameters that remain within nominal operating ranges or do not independently trigger a diagnostic trouble code or fault condition. Such diagnostic parameter variations may include, for example, operating values, learned offsets, adaptation values, or historical event indicators that, when considered in isolation, are insufficient to indicate a vehicle fault or abnormal condition.

In the described system, the exterior geometric deviations and the diagnostic parameter variations are treated as distinct analytical inputs derived from different inspection domains. The system is configured to correlate these inputs by evaluating whether diagnostic parameter variations that are individually insufficient to indicate a fault correspond to spatially localized exterior geometric deviations or structural anomalies associated with a common vehicle region, structure, or subsystem. A common vehicle region, structure, or subsystem may include, for example, a specific body panel, vehicle corner, engine compartment region, cooling region, suspension region, or other localized portion of the vehicle that has both a physical manifestation and an associated electronic control context.

The correlation performed by the system is not a simple aggregation of visual inspection results and diagnostic results. Rather, the correlation involves interpreting diagnostic parameter variations in view of the location, nature, and extent of identified geometric deviations or structural anomalies. In this manner, diagnostic parameter behavior that would otherwise be regarded as non-actionable may be reclassified as indicative of a physical vehicle condition when correlated with a corresponding geometric deviation or anomaly.

In certain embodiments, correlation between exterior geometric analysis results and vehicle diagnostic information is implemented using a multi-domain evidentiary framework that integrates geometric deviation data, structural anomaly data, diagnostic trouble codes, operational parameters, and temporal or event-based information. The correlation framework is designed to identify physical vehicle conditions that are not determinable from any single data source in isolation.

Correlation Inputs

The correlation process receives, as inputs, one or more of:

- Geometric deviation data derived from comparison of a reconstructed three-dimensional vehicle model with a manufacturer reference model, including region-localized deviation magnitudes, surface displacement distributions, or deviation heatmaps.
- Structural anomaly data derived from analysis of a reconstructed three-dimensional vehicle model when manufacturer reference geometry is unavailable, including symmetry violations, mesh inconsistencies, curvature outliers, or learned baseline deviations.
- Diagnostic indicators obtained from on-board diagnostic data, including DTCs (current or historical), electronic control unit status information, inter-module communication indicators, event-related data, sensor readings, and vehicle usage data.
- Temporal and event data, including timestamps associated with diagnostic records, IMU data, crash-related sensor events, airbag or restraint system indicators, and other signals indicative of abrupt acceleration, deceleration, or impact-like behavior.

Region-Based Association for Correlation

In one implementation, correlation is performed on a vehicle-region basis. The reconstructed three-dimensional model is segmented into a plurality of spatial regions corresponding to physical areas or subsystems of the vehicle. Each geometric deviation or structural anomaly is associated with at least one vehicle region. Diagnostic indicators are likewise associated with vehicle regions based on known subsystem-to-structure relationships, module placement, or inferred physical relevance.

This region-based association enables diagnostic indicators that are not independently determinative, such as plausibility indicators, configuration mismatches, or historical DTCs, to be evaluated in the context of localized geometric deviations or anomalies.

Factory-Referenced Correlation

When a manufacturer reference model is available, correlation includes evaluating whether geometric deviations identified by alignment of the reconstructed mesh with OEM CAD or mesh models correspond to diagnostic indicators associated with the same vehicle region or subsystem. Alignment may be performed using Iterative Closest Point (ICP), bundle-based optimization, or similar spatial registration techniques, and deviation heatmaps may be generated to quantify surface displacement relative to factory geometry In such embodiments, geometric deviations exceeding region-specific thresholds are treated as primary physical evidence, while diagnostic indicators—such as DTCs, ECU status anomalies, or configuration inconsistencies—are used to increase confidence that the deviations correspond to collision damage, misalignment, non-OEM components, repainting, disassembly, or repair-related degradation.

Reference-Free Correlation

When manufacturer reference geometry is unavailable, correlation is performed using structural anomalies extracted directly from the reconstructed three-dimensional model. Structural anomalies may be identified using symmetry analysis, geometric consistency analysis, mesh continuity evaluation, or learned baseline models derived from similar vehicles or intra-vehicle geometric relationships, as disclosed in the abnormal detection and AI matching portions of the disclosure In this case, diagnostic indicators are correlated with anomaly-bearing regions to determine whether the anomalies are consistent with operational, historical, or event-based vehicle data. Diagnostic indicators that do not independently indicate a collision—such as historical DTCs, plausibility mismatches, or compensation behaviors—may nonetheless corroborate the presence of a physical condition when aligned with localized structural anomalies.

Temporal and Event-Weighted Correlation

In some embodiments, correlation further includes temporal analysis. Diagnostic indicators and IMU data are evaluated to determine whether recorded events, such as impact-like motion, airbag-related signals, or abrupt acceleration or deceleration, correspond to an inferred time frame associated with detected geometric deviations or anomalies. When such temporal correspondence is identified, the system increases the weighting or significance of the correlated condition This temporal weighting allows the system to identify collision-related conditions even when repairs or component replacements have partially masked physical evidence or cleared diagnostic fault codes.

Correlation Outcome and Assessment Generation

A correlated physical vehicle condition is identified when geometric deviation data or structural anomaly data and diagnostic indicators satisfy region-level correspondence criteria. Correlation may be expressed as a combined score, weighted assessment, or confidence level derived from normalized geometric and diagnostic inputs. The resulting diagnostic assessment may indicate collision damage, structural deformation, non-OEM or counterfeit components, repainting, disassembly, or repair-related degradation, none of which is required to be identifiable from geometric analysis or diagnostic data alone.

The vehicle condition identified through such correlation may include, but is not limited to, prior collision damage, incomplete or low-quality repair activity, component substitution, or latent structural or subsystem vulnerabilities. In such cases, neither the exterior geometric analysis alone nor the diagnostic data analysis alone would be sufficient to identify the vehicle condition with confidence. The identified vehicle condition is therefore not identifiable from the exterior geometric analysis or the diagnostic data alone, but is revealed through the combined, correlated analysis performed by the system. After completing both diagnostic and visual analysis, the system generates a comprehensive inspection report. The report may include:

- a structural deviation map;
- identification of damaged, replaced, or non-genuine parts;
- a list of detected system or electronic module faults;
- inference of prior collision events;
  - verification of component authenticity using barcode or QR-code comparison with OEM data;
  - battery health metrics for electric or hybrid vehicles; and
  - an overall condition summary including side-by-side comparative images between the inspected vehicle and OEM reference models.

The system may further integrate with valuation or repair-cost estimation platforms, allowing the generated report to be used for resale appraisal, insurance assessment, or maintenance planning.

In example embodiments, vehicle imaging, with optimal supplemental data input from acoustic sensors, magnetic sensors, LiDAR is utilized. Deep learning models such as ResNet (Residual Networks), VGG (Visual Geometry Group) are applied to classify diagnostic images identifying a failure cause. Example embodiments detect multi-cause failures as well as predict system degradation trends for early warning and preventive maintenance.

The system employs artificial intelligence functionality to analyze image data, sensor data, and vehicle diagnostic data for purposes of reconstructing vehicle geometry, identifying deviations from manufacturer standards, and classifying detected anomalies. The artificial intelligence functionality described herein is implemented as one or more software modules executed by a processor of a mobile device, a remote server, or a combination thereof. The AI functionality is not limited to a particular algorithmic architecture and may be implemented using classical computer vision techniques, machine-learning models, deep-learning models, or hybrid approaches.

In one example embodiment, the AI functionality includes image-based perception and reconstruction processing. Captured image frames from the mobile device camera are processed to extract visual features representative of edges, corners, textures, or other salient structures. Feature extraction may be performed using feature detection and description techniques such as ORB (Oriented FAST and Rotated BRIEF), SIFT (Scale-Invariant Feature Transform), AKAZE, or equivalent feature extraction methods. Correspondences between features across successive image frames are identified and used to estimate relative camera motion. Camera pose estimation may be refined using bundle adjustment, visual-inertial odometry, or simultaneous localization and mapping (SLAM) techniques that incorporate inertial measurement unit data. Based on the estimated camera poses and matched features, a three-dimensional point cloud or mesh representing the exterior geometry of the vehicle is reconstructed. The point cloud suitably comprises a plurality of three-dimensional points corresponding to surface locations on the vehicle exterior, each point being defined in a common coordinate space derived from the captured image data and associated motion data. The point cloud is generated by identifying corresponding features across multiple exterior images captured from different viewpoints and triangulating spatial positions of the features based on estimated camera poses. The point cloud may represent sparse or dense surface information depending on the reconstruction technique employed and serves as an intermediate geometric representation from which a surface model, mesh, or other continuous geometric representation of the vehicle exterior is derived for subsequent geometric deviation analysis or structural anomaly analysis.

Where depth data is available, such as from a LiDAR or time-of-flight sensor, the AI processing may incorporate such depth data to improve reconstruction accuracy or reduce ambiguity.

In further embodiments, the AI functionality includes geometric alignment and comparison processing. When a manufacturer-provided reference model is available, the reconstructed vehicle model is aligned to the reference model using a registration technique, such as the ICP algorithm noted above, or other suitable point-set or mesh registration methods. After alignment, geometric differences between the reconstructed model and the reference model are computed to generate deviation metrics or deviation maps. These metrics may identify dimensional discrepancies, surface warping, misaligned panels, or other deviations exceeding expected tolerances. When a manufacturer reference model is unavailable or incomplete, the AI functionality may instead perform intra-model anomaly detection, comparison against generalized vehicle class models, or statistical shape analysis to identify irregularities within the reconstructed geometry.

The AI functionality further includes classification and inference processing to determine whether detected deviations correspond to damage, repair activity, or non-original components. Classification may be based on geometric deviation patterns, texture or color inconsistencies in image data, detected fastener or seam irregularities, or corroborating signals from auxiliary sensors. For example, magnetic sensor data may be used to indicate filler material, ultrasonic sensor data may be used to indicate thickness variations, and infrared sensor data may be used to indicate thermal or material inconsistencies. The AI processing may combine these inputs using weighted decision logic, probabilistic models, or trained classifiers to produce confidence-scored findings.

The AI functionality may also analyze vehicle diagnostic data to infer vehicle condition or prior events. Diagnostic trouble codes, freeze frame data, live sensor data, odometer readings, and, for electric or hybrid vehicles, battery parameters such as state of charge, state of health, cell temperature, and voltage may be processed using rule-based logic, statistical analysis, or machine-learning models to detect patterns indicative of collisions, degradation, or tampering. The AI processing may further correlate diagnostic findings with geometric findings to increase confidence in detected conditions.

The artificial intelligence functionality described herein may be implemented using one or more commercially available AI frameworks, libraries, or platforms. By way of example and not limitation, image processing and computer vision operations may be implemented using libraries such as OpenCV, Open3D, or similar computer vision toolkits. Machine-learning or deep-learning models may be implemented using platforms such as TensorFlow, PyTorch, ONNX Runtime, or comparable frameworks capable of executing trained models on mobile devices or servers. In some embodiments, AI processing may leverage hardware acceleration available on modern mobile devices, such as graphics processing units (GPUs), neural processing units (NPUs), or digital signal processors (DSPs). Cloud-based AI services or platforms may alternatively or additionally be used to perform portions of the processing, including model training, inference, or large-scale comparison against reference datasets.

Training of machine-learning or deep-learning models, where used, may be performed using datasets comprising manufacturer reference models, labeled images of vehicles with known damage or repair history, simulated vehicle models, or combinations thereof. However, the invention does not require that any particular training methodology, dataset, or model architecture be used, and any suitable AI techniques may be utilized.

FIG. 1 illustrates an example embodiment of a system 100 for multi-domain vehicle condition assessment via OBD data and sensor-based deep learning classification. Vehicle 104 includes ECUs 108 which communicate OBD data, suitably via DLC port 112, responsive to queries from OBD scanner 116. OBD scanner 116 is in data communication with a digital data device, illustrated as smartphone 120, by any suitable wired or wireless medium, such as Bluetooth Low Energy (BLE). Smartphone 120 is also in data communication with cloud service 124 via network cloud 128. Network cloud 128 is comprised of any suitable data carrying medium, wired, wireless or any combination thereof. Network cloud 128 suitably includes a Local Area Network (LAN), a Wide Area Network (WAN), which may comprised the Internet, or any suitable combination thereof.

Smartphone 120 provides a hub for OBD data and cloud service integration. A modern smartphone also suitably serves as a highly capable multi-sensor acquisition device that can capture a variety of data types to supplement OBD information when performing a vehicle valuation or condition assessment. While the OBD system provides insight into the vehicle's internal mechanical and electronic health, the smartphone captures external, environmental, and contextual data that together form a comprehensive view of the vehicle's true condition and market value.

The smartphone's camera system is a direct and versatile source of visual data. High-resolution rear cameras can capture images or video of the vehicle's exterior from multiple angles, documenting paint condition, body alignment, panel gaps, and the presence of dents, scratches, or corrosion. Many devices also support depth-sensing technologies such as LiDAR or time-of-flight (ToF) sensors, which can measure distance and surface contour with high precision. Several modern smartphones, particularly high-end models, include built-in LiDAR sensors as part of their camera systems. For example, Apple's recent iPhone Pro and iPad Pro devices integrate compact LiDAR scanners that emit pulses of infrared laser light and measure the time it takes for the reflections to return. This allows the phone to generate precise depth maps and 3D spatial representations of nearby objects and surfaces These enable three-dimensional mapping of the vehicle's body, allowing reconstruction of accurate geometric models that reveal even minor deformations or inconsistencies in surface curvature. This visual and spatial data can be processed locally or transmitted to the cloud server for automated defect detection and structural analysis.

The smartphone's microphone and audio subsystem can be used to record acoustic signatures while the vehicle engine or key subsystems are operating. Variations in sound frequency, amplitude, or rhythm can indicate mechanical wear, misfires, or bearing issues. These audio patterns, when cross-referenced with OBD sensor readings such as RPM or misfire counts, provide corroborating evidence of mechanical condition. A smartphone's accelerometer, gyroscope, and magnetometer, components of its IMU, further contribute motion and orientation data. These sensors detect vibration, movement, and positioning, which can be used to evaluate drivetrain smoothness, idle stability, or abnormal oscillations during testing.

The smartphone's ambient light sensor suitably assists in adjusting image capture for consistent exposure across lighting conditions, improving visual analysis accuracy. The smartphone's infrared (IR) proximity sensor, while primarily designed for screen interaction, can be repurposed in some implementations for close-range distance measurement or detection of surface irregularities when the phone is held near specific areas of the bodywork. Its global positioning system (GPS) module suitably provides geolocation data that tags the inspection environment, supporting provenance tracking and environmental correlation (e.g., vehicles operating in harsh climates may exhibit faster degradation).

Wireless communication interfaces also play key roles. The smartphone's Bluetooth transceiver connects the smartphone to the OBD-II adapter, enabling live data streaming from the vehicle's ECUs. Wi-Fi and cellular network interfaces allow transmission of collected data to the cloud server for processing, machine learning classification, or archival. These communication pathways ensure that sensor data, OBD readings, and metadata are securely aggregated and synchronized across devices and analytical systems.

Finally, the smartphone touchscreen interface 132 serves as the user's primary input and control mechanism. It enables a user to guide the inspection process, scanning QR codes or VIN labels, selecting damage regions, entering notes, or confirming OBD connections. Its graphical user interface is suitably used to display real-time feedback, such as live camera overlays showing identified anomalies, color-coded damage zones, or preliminary valuation scores derived from fused data. An example valuation report 134 is shown on touchscreen 132

Through this combination of imaging, sensing, orientation, acoustic, and connectivity capabilities, the smartphone functions as a mobile inspection hub that complements the purely internal diagnostic perspective of the OBD system. By merging internal electronic health indicators with externally observable and contextual information, the smartphone enables the creation of a multi-domain, data-rich valuation that reflects both the mechanical and structural state of the vehicle in real-world conditions.

Valuation data is also suitably acquired by external data acquisition systems when features are unavailable natively on a smartphone, or additional capabilities or features are desired to supplement smartphone components. Examples include acoustic transducer 136, magnetic sensor 140, LiDAR system 144, and IR sensor 146. External sensors, such as acoustic transducers, magnetic field sensors, IR scanners, digital cameras, and LiDAR units, provide specialized data streams that substantially extend the diagnostic and valuation capabilities of a smartphone-based inspection system. While a smartphones may offer general-purpose sensing (camera, microphone, IMU, GPS), dedicated external devices capture higher-fidelity, domain-specific measurements that a smartphone's built-in hardware cannot achieve on its own. When their outputs are integrated through the same mobile application and transmitted to the cloud server, they create a multi-domain data environment that fuses internal diagnostics, visual inspection, and environmental sensing into a unified valuation framework.

An acoustic sensor array, for example, can capture audio data with greater range, directional sensitivity, and frequency response than the smartphone's internal microphone. By placing one or more acoustic sensors around the engine compartment, undercarriage, or near wheel assemblies, the system can isolate and analyze sound signatures associated with mechanical imbalance, exhaust leaks, misfires, or bearing degradation. The collected audio waveforms are converted into spectral profiles that can be correlated with OBD live data (e.g., RPM, cylinder activity, or ignition timing) to confirm whether audible anomalies correspond to diagnostic trouble codes. In valuation terms, these acoustic indicators provide objective measures of drivetrain health and refinement that are not visible through external inspection.

Magnetic sensors can be used to detect variations in material density or the presence of non-original repair work. Portable magnetic flux sensors or paint-thickness gauges measure the magnetic resistance or eddy current response of body panels. Deviations from expected magnetic signatures reveal hidden body filler, prior damage, or panel replacements. This information, combined with camera imagery and LiDAR data, provides a more accurate structural integrity assessment, enabling the system to quantify repair history and residual strength, key factors in valuation and resale grading.

IR scanners provide thermal imaging and near-infrared reflectance data. When directed at engine components, exhaust systems, or braking assemblies, Infrared (IR) readings can detect abnormal heat distribution indicative of friction, fluid leaks, or partial mechanical failure. During surface inspection, infrared reflectometry reveals subsurface irregularities such as filler, corrosion, or undercoat delamination that standard cameras cannot detect. By analyzing temperature gradients and reflectance signatures, the system can distinguish between normal operating heat and anomalies that suggest wear or inefficiency.

External digital cameras, especially those with wide dynamic range, polarized filters, or multispectral capability, can exceed the image quality and field of view of a smartphone camera. Suitably mounted on tripods, gimbals, or 360-degree rigs, these cameras provide consistent, repeatable imagery across lighting conditions, enabling high-precision 3D reconstruction of the vehicle's body. They can capture minute surface deviations and provide reference geometry for comparison against manufacturer CAD data or prior scans, forming the visual basis of automated damage classification and cosmetic grading.

LiDAR sensors emit pulses of laser light and measure their reflections to construct dense, three-dimensional point clouds of a vehicle's exterior surfaces. When integrated with the smartphone app, LiDAR data provide absolute spatial measurements, allowing the system to quantify dent depth, panel deformation, or structural misalignment with millimeter precision. These point are suitably processed to identify geometric deviations from expected model contours, classify damage severity, and cross-correlate with visible defects detected in photographic imagery.

When combined, these external sensors produce multimodal datasets that fill the gaps left by smartphone-only inspection. Acoustic and magnetic sensors add subsurface and functional insight; infrared and LiDAR sensors provide structural and thermal mapping; and enhanced imaging captures cosmetic and geometric precision. The smartphone acts as the central gateway, coordinating sensor synchronization, timestamping data, and transmitting the aggregated information to the cloud server for interpretation.

The resulting system enables a holistic form of valuation that incorporates not only the vehicle's electronic and mechanical health (via OBD and acoustic/magnetic sensors) but also its structural and aesthetic integrity (via LiDAR, infrared, and optical imaging). This layered approach transforms valuation from a subjective appraisal into an objective, sensor-driven process that quantifies every accessible dimension of vehicle condition, from the visible exterior to internal components that would otherwise require manual inspection.

Cloud server 124 suitably functions as a central computational and data management hub that connects local devices, such as smartphones or OBD scanners, with large-scale analytics, storage, and machine learning infrastructure. Its primary roles can be understood in terms of data reception, processing, storage, and communication, each supporting different aspects of the valuation workflow.

When operating within such a system, the cloud server. The incoming data may include: OBD-derived diagnostic information, such as fault codes, sensor readings, engine parameters, and ECU reports transmitted via a Bluetooth or Wi-Fi-connected scan tool; sensor-derived data, including image sets, LiDAR point clouds, infrared scans, or accelerometer readings captured by the smartphone or auxiliary sensors; geolocation and environmental context, such as GPS coordinates, ambient temperature, and lighting conditions at the time of inspection; and user input or metadata, including VIN entry, vehicle type selection, inspection identifiers, and condition annotations. The cloud server authenticates these inputs, timestamps them, and associates them with a unique session or user account.

Once the data have been received, the cloud server performs multiple layers of processing. It runs preprocessing algorithms to normalize image dimensions, filter noise from sensor readings, and validate diagnostic codes. The data are then parsed into structured formats suitable for analytic models. Advanced modules, suitably convolutional neural networks (CNNs) for image classification, regression engines for valuation, and rule-based evaluators for diagnostic interpretation, operate on these datasets to generate condition assessments, fault likelihoods, and quantitative value predictions. In multi-domain systems, the server performs data fusion, combining visual, diagnostic, and contextual inputs into a unified analytical model that correlates internal and external vehicle health indicators.

The data stored on the cloud server are both transient (session-based) and persistent (long-term). Persistent data include anonymized inspection histories, vehicle condition archives, market valuation benchmarks, model training datasets, and historical records of diagnostic outcomes. The server may also maintain user profiles, authentication credentials, and system configuration parameters. In addition, cloud infrastructure supports redundant backups and distributed storage to ensure data integrity and availability.

After analysis, the cloud server communicates results back to the smartphone in real time or near real time. The returned data can include processed diagnostic summaries, structured valuation scores, color-coded damage maps, repair cost estimates, and comparative benchmarks showing how the inspected vehicle ranks against similar makes and models. The server may also send recommendations, such as suggested maintenance actions or re-inspection intervals, and transmit alerts if anomalies are detected. In some configurations, the cloud communicates further with third-party systems, such as insurer databases, auction platforms, or manufacturer service networks, allowing results to be validated or monetized externally.

Overall, the cloud server functions as the core analytical and coordination node of the system. It bridges the resource-limited environment of the smartphone with the large-scale computational capacity required for AI-driven analysis and secure data management, enabling continuous, synchronized exchange of diagnostic, sensory, and valuation data between local and remote domains.

FIG. 2 is a table illustrating representative hardware and functional components usable in a mobile-based vehicle inspection and diagnostic system, categorized according to component availability across modern smartphones and additional components used in certain embodiments. The table is organized into multiple columns identifying: (i) a component type, (ii) a category indicating availability on smartphones, (iii) a description of the role of the component within the vehicle inspection system, and (iv) non-limiting examples of smartphones or devices that include or implement the corresponding component. Accordingly, FIG. 2 illustrates that the disclosed vehicle inspection and diagnostic system is implementable using a spectrum of hardware configurations, ranging from a baseline embodiment utilizing a smartphone and a diagnostic interface device, to enhanced embodiments incorporating additional integrated smartphone sensors and optional external sensing devices. The table shows that the system is not dependent on specialized inspection equipment and is suitably adaptable to the capabilities of commercially available mobile devices.

Figure 3:
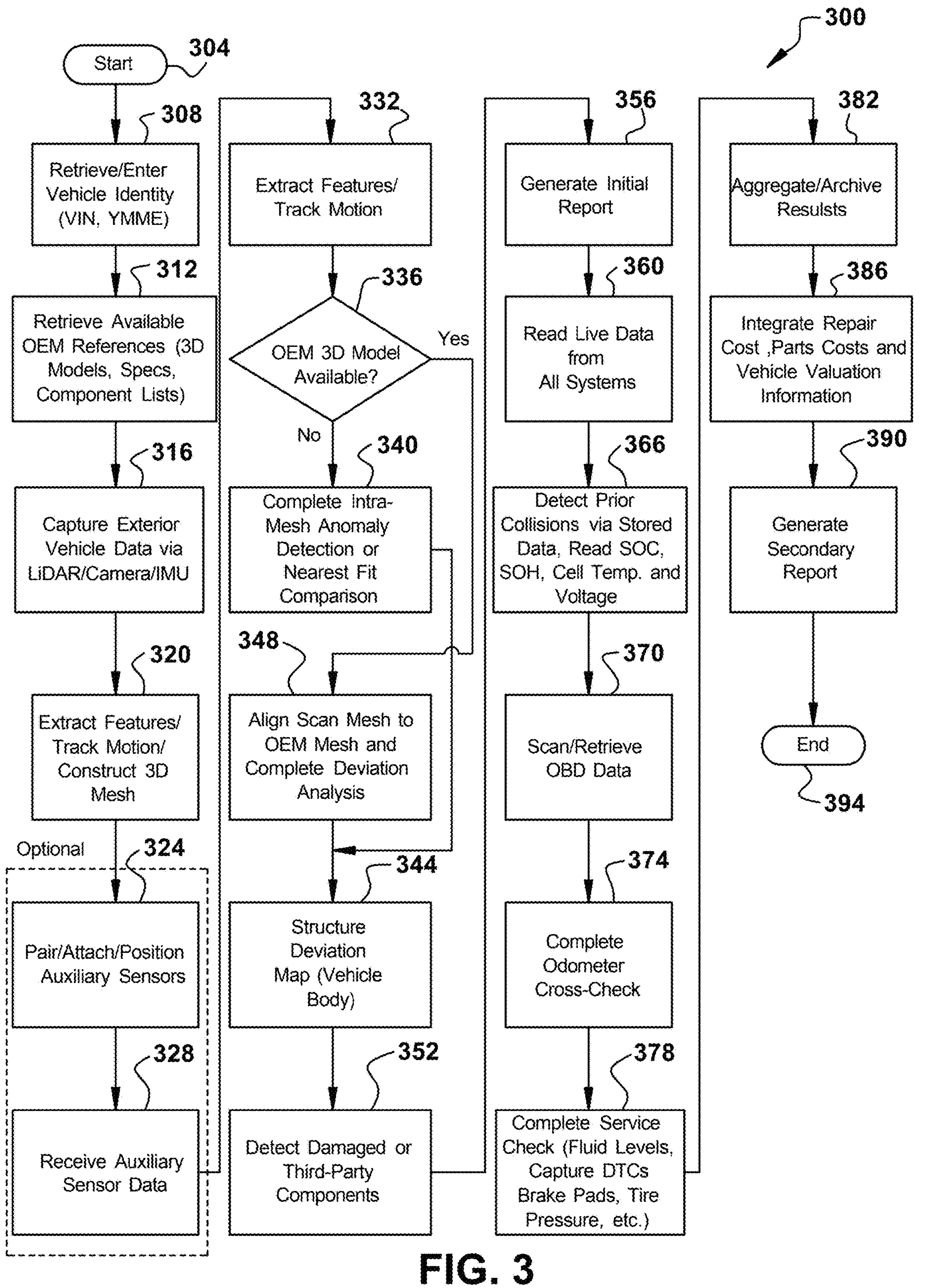
FIG. 3 illustrates an example embodiment of flowchart for multi-domain vehicle condition assessment via OBD data and sensor-based deep learning classification.

FIG. 3 illustrates an example embodiment of a flowchart 300 for multi-domain vehicle condition assessment via OBD data and sensor-based deep learning classification. The system commences at block 304 and proceeds to block 308 wherein a vehicle is identified in conjunction with its VIN and its associated YMME. A VIN is a unique 17-character alphanumeric code assigned to every vehicle at the time of manufacture, serving as its digital fingerprint. It encodes key information about the vehicle's origin, manufacturer, design, and production sequence, including details such as body type, engine configuration, and assembly plant. The YMME are standardized identifiers derived from specific positions within the VIN that collectively describe the vehicle's production year, manufacturer, product line, and powertrain specification. Together, the VIN and YMME provide a reliable and universally recognized means of identifying a vehicle for diagnostic, registration, insurance, and valuation purposes. A VIN may be obtained from OBD data or via input or scan from a VIN visible on the vehicle itself.

Once the vehicle has been identified, related Original Equipment Manufacturer (OEM) information, such as 3D models, vehicle specifications, components, and the like. are retrieved at block 312. Next, at block 316, exterior vehicle data is captured, suitably via one or more of digital images, LiDAR, or IMU. Features are extracted from captured data at block 320 and a 3D mesh is constructed. Optional, secondary sensors, if used, are added at block 324, and resulting captured data is received at block 328. Next, features are extracted at block 332, which may incorporate motion information during capture.

In example embodiments, the system represents the exterior geometry of an inspected vehicle using a mesh. As used herein, a mesh refers to a digital surface representation of a physical object formed from a plurality of interconnected surface elements, such as triangular or quadrilateral faces, defined by vertices in three-dimensional space. The mesh approximates the continuous exterior surface of the vehicle body and provides a structured geometric representation suitable for quantitative analysis.

The mesh is generated from image data captured from multiple viewpoints around the vehicle and associated motion data obtained from one or more sensors of a mobile computing device, such as an inertial measurement unit. In some embodiments, depth data may additionally be used. Image-based reconstruction techniques are applied to estimate camera poses, recover three-dimensional structure, and generate an initial geometric representation, which may be converted from a point-based representation into a surface mesh. The resulting mesh represents the observed exterior geometry of the inspected vehicle at the time of inspection.

In embodiments in which manufacturer reference data is available, the system obtains an OEM mesh or other OEM geometric representation corresponding to the inspected vehicle. The OEM mesh represents expected factory geometry for the vehicle and may be derived from manufacturer-provided three-dimensional models, dimensional specifications, or other reference data. The reconstructed vehicle mesh is aligned with the OEM mesh using coordinate alignment and registration techniques. Following alignment, the system performs mesh-to-mesh comparison to compute geometric deviations between the reconstructed vehicle mesh and the OEM mesh. Such deviations may be measured at individual vertices, faces, or defined surface regions and may be evaluated relative to manufacturer-defined tolerances. Mesh-based deviation analysis enables identification of structural deformation, misalignment, or other geometry changes indicative of collision damage, repair activity, or non-original components.

In embodiments in which OEM reference data is unavailable, incomplete, or unsuitable for direct comparison, the system performs analysis using mesh anomaly detection. In such embodiments, the reconstructed vehicle mesh itself serves as the primary analytical reference. The system may analyze the mesh to identify internal inconsistencies, asymmetries, or localized irregularities by comparing corresponding regions of the mesh, such as left-side and right-side surfaces, adjacent panels, or expected continuity across panel boundaries. The system may further analyze curvature, surface smoothness, thickness variation, or local deviation patterns within the mesh to identify anomalous regions that differ from surrounding geometry or from learned norms derived from similar vehicles.

Mesh structural anomaly detection may be performed using statistical techniques, rule-based heuristics, or machine-learning models trained to recognize typical surface characteristics of vehicle bodies. As used herein, a structural anomaly refers to a geometric condition of the vehicle exterior that departs from expected structural continuity, symmetry, or consistency as determined without reference to manufacturer-provided models.

In one implementation, the system detects structural anomalies through symmetry-based analysis. The system identifies corresponding regions of the vehicle exterior that are expected to be substantially symmetrical, such as left-side and right-side body panels, and registers the corresponding surface regions into a common coordinate frame. Spatial differences between the mirrored regions are then measured. When the measured differences exceed one or more predetermined thresholds, the system identifies the affected region as exhibiting a structural anomaly, which may indicate unilateral deformation, repair activity, or component replacement.

In another implementation, the system evaluates geometric consistency across adjacent or related body panels. The system analyzes panel-to-panel transitions, including gap uniformity, edge alignment, and continuity of surface curvature between neighboring panels. Structural anomalies are identified when adjacent panels exhibit discontinuities, abrupt curvature changes, or inconsistent spacing that deviates from expected panel-to-panel relationships, indicating possible misalignment, improper installation, or structural distortion.

In certain embodiments, the system employs learned baseline models derived from geometric data associated with a population of similar vehicles. Such learned baseline models may represent expected dimensional envelopes, curvature distributions, or geometric feature patterns for vehicles of a similar body style, class, or generation. The reconstructed geometry of the inspected vehicle is compared against the learned baseline model to identify localized or global deviations that fall outside statistically expected bounds. Regions exceeding such bounds are identified as structural anomalies.

In some embodiments, the system evaluates intra-vehicle geometric coherence by analyzing internal consistency across multiple scanned regions of the same vehicle. The system assesses continuity of surface curvature, smoothness of extended surface regions, and the presence of localized bulges, depressions, or flattened areas that are inconsistent with surrounding geometry. Structural anomalies are identified when localized geometric characteristics diverge from the prevailing geometric context of the vehicle exterior.

In further embodiments, the system performs feature-based structural analysis by extracting geometric features such as edges, ridges, corners, surface normals, or curvature extrema from the reconstructed three-dimensional model. The system evaluates the alignment, orientation, repetition, and spacing of such features. Structural anomalies are identified when extracted features exhibit irregular alignment, unexpected interruptions, or inconsistent spatial relationships indicative of deformation, material modification, or component displacement.

In enhanced embodiments, detection of structural anomalies may be supplemented using auxiliary sensor data when such data is available. Magnetic field measurements may identify regions of altered material composition, ultrasonic measurements may reveal subsurface discontinuities or thickness variations, and infrared measurements may detect thermal inconsistencies associated with repaired or modified areas. The system may correlate such sensor-derived indicators with geometric findings to increase confidence in identifying structural anomalies.

In certain embodiments, the system assigns confidence indicators or severity measures to detected structural anomalies based on factors including the magnitude of geometric irregularity, the spatial extent of the affected region, and consistency of detection across multiple analytical techniques. Detected structural anomalies and associated confidence measures may be incorporated into a diagnostic assessment or inspection report to assist users in evaluating the physical condition of the vehicle.

Accordingly, when manufacturer reference geometry is unavailable, the disclosed system is configured to detect structural anomalies using a combination of symmetry analysis, geometric consistency evaluation, learned baseline modeling, intra-vehicle coherence analysis, feature-based evaluation, and optional sensor-assisted techniques. These approaches enable reliable identification of structural irregularities in vehicle exteriors without reliance on OEM-specific reference data, thereby supporting practical inspection and diagnostic use across a wide range of vehicles.

Anomalies identified through such mesh-only analysis may indicate potential prior damage, repair activity, filler material, or replacement components, even in the absence of OEM reference geometry. In some embodiments, anomaly detection results may be assigned confidence values based on the magnitude, extent, or consistency of detected irregularities.

The mesh further serves as a spatial framework for integrating additional data sources. For example, auxiliary sensor data, such as magnetic, ultrasonic, or thermal measurements, may be mapped to corresponding locations on the mesh. This enables correlation between surface geometry and subsurface or material properties. The mesh also enables aggregation of findings at a component or panel level, such that detected deviations or anomalies may be associated with specific vehicle components, including doors, quarter panels, bumpers, or other exterior structures.

The mesh-based representation thus provides a common analytical substrate for multiple inspection scenarios. When OEM reference data is available, the mesh enables direct factory-anchored deviation analysis. When OEM reference data is unavailable, the mesh enables self-referential or learned anomaly detection. In both cases, the mesh transforms raw image and sensor data into a structured geometric representation that supports objective, repeatable assessment of vehicle exterior condition.

Accordingly, use of a mesh allows the system to perform geometric reasoning tied to physical vehicle structure, rather than relying solely on image classification or visual heuristics. The mesh-based approach enables flexible operation across different vehicles, data availability conditions, and inspection environments, while maintaining consistent analytical capabilities.

A test is made at block 336 to determine of whether OEM 3D model data is available. If not, mesh anomaly detection is completed at block 340 before a structure deviation map is generated at block 344 accordingly. If OEM 3D data is available, it is aligned with a generated mesh at block 348 and a deviation analysis is then completed at block 344 accordingly.

Next, vehicle damage or third-party components are determined at block 352 and an initial report is suitably generated at block 356. The initial report follows completion of the exterior vehicle scan and associated artificial intelligence analysis, but prior to completion of full vehicle diagnostics. The initial report is configured to provide an early, geometry- and surface-based assessment of the vehicle that reflects conditions detectable from exterior inspection and sensor analysis alone. This initial report may include a reconstructed three-dimensional representation of the vehicle, a deviation map identifying geometric differences relative to a manufacturer reference model or expected structural norms, and preliminary findings relating to suspected damage, deformation, repair activity, or non-original components.

The initial report serves as an intermediate analytical output that captures structural and surface-related findings independently of electronic diagnostic data. By generating the initial report prior to ingestion of OBD-derived information, the system establishes a baseline assessment derived from physical evidence, thereby reducing bias that could otherwise be introduced by OBD codes or historical data. In this manner, the initial report represents a first-pass, evidence-driven evaluation of the vehicle's physical condition based on camera data, optional auxiliary sensor data, and manufacturer reference information.

In the context of the present disclosure, the term diagnostic fault refers broadly to a vehicle condition indicative of abnormality, degradation, inconsistency, or departure from expected vehicle configuration, structure, or operation. A diagnostic fault as used herein is not limited to fault indications generated by an on-board diagnostic system, nor is it limited to the presence of diagnostic trouble codes, malfunction indicators, or threshold-based electronic fault determinations.

A diagnostic fault may include, without limitation, physical vehicle conditions, component-level conditions, and system-level conditions that affect vehicle integrity, performance, safety, or value. Such diagnostic faults may include, for example, damaged parts, structural deformation, misalignment, or other collision-related damage; installation of non-OEM or non-conforming components; incomplete, improper, or low-quality repair activity; substitution of components with differing material, geometric, or performance characteristics; or latent physical vulnerabilities resulting from prior damage or modification.

Diagnostic faults may further include system-level or module-level conditions, such as electronic control module errors, abnormal subsystem behavior, configuration inconsistencies, compensatory operating behavior, adaptation drift, historical error conditions, or other indicators of degraded or atypical operation, whether or not such conditions result in the generation of a diagnostic trouble code. In some embodiments, a diagnostic fault may be inferred from relationships among multiple diagnostic indicators rather than from any single explicit fault signal.

Importantly, a diagnostic fault as used herein may exist even when a vehicle reports nominal operation according to conventional diagnostic systems. Many physical conditions, including collision damage, non-OEM parts, or repair-related degradation, do not necessarily trigger fault detection thresholds designed to identify acute electronic failures. Accordingly, the absence of a diagnostic trouble code or fault indicator does not preclude the existence of a diagnostic fault as defined herein.

The system described herein is configured to identify diagnostic faults through correlated analysis of exterior geometric deviations, structural anomalies, and vehicle operational or diagnostic data. In this manner, diagnostic faults may be identified based on physical evidence, inferred operational behavior, or combinations thereof, rather than being limited to electronically declared faults. Diagnostic faults identified by the system therefore encompass both electronically detectable conditions and physically manifested conditions that affect vehicle structure, configuration, or integrity.

In some embodiments, the initial report is used to guide subsequent diagnostic operations. For example, structural deviations or suspected component irregularities identified in the initial report may influence which diagnostic subsystems are queried, which vehicle parameters are prioritized, or how diagnostic findings are interpreted. In other embodiments, the initial report may be presented to a user or technician to provide early insight into potential issues before completion of a full diagnostic workflow.

The initial report may further be stored, transmitted, or archived as a standalone record representing the exterior condition of the vehicle at a particular point in time. This enables later comparison with subsequent inspections, supports auditability of the inspection process, and allows separation of physical condition findings from electronic diagnostic findings. The initial report may also be combined with later-generated diagnostic and valuation reports to form a comprehensive assessment, while still preserving the independent analytical value of the initial report itself.

The generation of the initial report as a discrete output thus supports staged analysis, improves transparency of automated inference, and enables structured correlation between physical inspection results and later diagnostic data, without requiring that all data sources be available or processed simultaneously. An example initial report is found in FIGS. 12A and 12B Live OBD data is read at block 360. Prior collisions are determined via stored OBD data, and SOC, SOH, cell temperature and voltage are determined at block 366. OBD data, including DTCs is scanned and retrieved at block 370. Diagnostic information obtained via an OBD interface suitable for collision corroboration may include DTCs, parameter values, historical records, configuration data, and inter-module relationships. Such diagnostic information is not relied upon to directly detect collision events or collision damage. Instead, diagnostic information is evaluated as secondary, contextual, and corroborative evidence when correlated with exterior geometric deviations or structural anomalies identified through image-based geometric analysis.

DTCs, when present, are not treated as determinative of a collision condition. Rather, certain categories of DTCs may serve as collision-assistive diagnostic indicators that are consistent with, suggestive of, or correlated with physical vehicle conditions such as collision damage, structural deformation, non-standard component installation, or repair activity. These DTCs are not required for identification of a physical vehicle condition, and the absence of DTCs does not preclude detection of such conditions by the system.

In one embodiment, diagnostic trouble codes useful for collision-related condition assessment include sensor plausibility or correlation DTCs, which indicate inconsistencies between sensor readings and expected physical relationships. Such DTCs may arise when sensor outputs do not align with other sensor values, operating states, or physical expectations, and may be consistent with bent mounting structures, shifted components, airflow obstruction, or misalignment resulting from collision damage or repair activity.

Diagnostic trouble codes may further include inter-module communication or network-related DTCs, such as codes indicating lost, intermittent, delayed, or degraded communication between vehicle control modules. Such DTCs may be consistent with damaged wiring, grounding issues, connector disturbances, or module replacement activity associated with collision damage or subsequent repair.

In some embodiments, diagnostic trouble codes include configuration, calibration, or variant mismatch DTCs, which indicate that a control module configuration, calibration identifier, or variant coding does not match an expected vehicle configuration. Such DTCs may be associated with non-OEM component installation, improper module replacement, salvage repairs, or incomplete post-repair programming, and may provide corroborative evidence of non-standard parts or repair quality issues.

Diagnostic trouble codes may also include control authority limit or compensation-related DTCs, which indicate that a vehicle subsystem is operating near or beyond expected control limits or is exhibiting compensatory behavior. Such DTCs may be consistent with altered airflow, cooling performance, alignment, structural deformation, or subsystem inefficiencies caused by physical damage or repair-related modifications.

Additionally, diagnostic trouble codes may include chassis, stability, steering, or alignment-related DTCs, including codes associated with steering angle, yaw rate, suspension position, or stability control plausibility. Such DTCs may be consistent with frame damage, misalignment, or structural repair issues and may provide corroborative information when evaluated in conjunction with exterior geometric deviations localized to a corresponding vehicle region.

In some embodiments, diagnostic information further includes historical or transient DTC data, such as previously stored, cleared, or intermittent DTCs, freeze-frame records, or event-related snapshots captured by vehicle control modules. Such historical diagnostic information may reflect prior collision or repair events even when no active diagnostic trouble codes are currently present.

Diagnostic trouble codes and other diagnostic information are evaluated in combination with exterior geometric deviations or structural anomalies, rather than in isolation. A diagnostic trouble code or diagnostic parameter variation that is individually insufficient to indicate a fault or physical condition may acquire diagnostic significance when correlated with spatially localized geometric deviations associated with a common vehicle region, structure, or subsystem.

Accordingly, diagnostic trouble codes and diagnostic information are used by the system as secondary indicators that contextualize and corroborate physical evidence derived from exterior geometric analysis. The system is configured to identify physical vehicle conditions, including collision damage, structural deformation, non-standard components, non-OEM parts, and repair quality issues, regardless of whether diagnostic trouble codes are present, active, or absent.

An odometer cross-check is completed at block 374. A complete service check, such as fluid levels or condition, brake pad wear, tire wear, and tire pressure is obtained at block 378 and data is aggregated at block 382. Repair cost, parts cost and vehicle valuation is completed at block 386. A secondary report is generated at block 390 before the system is completed at block 394.

Below is example pseudocode for a multi-domain vehicle condition system via OBD data and imaged-based deep learning classification:

```
function RUN_INSPECTION( ):
  UI, CAM, IMU = MobileUI( ), MobileCamera( ), MobileIMU( )
  DEPTH = MobileDepth(optional=true)   // LiDAR/ToF if present
  AUX = AuxKit(optional=true)   // magnetic/ultrasonic/IR if present
  OBD = OBDDongle(optional=true)
  CLOUD = Cloud( )
  // (1) Vehicle ID (VIN preferred; YMME fallback)
  vin = (OBD.connect( ) ? OBD.readVIN( ) : null)
  if isEmpty(vin):
    vin = UI.text("VIN (optional)", "")
    ymme = UI.ymme("Enter YMME")
  else:
    ymme = UI.confirm("Enter/confirm YMME?") ? UI.ymme("Enter YMME") : null
  ID = { vin: (isEmpty(vin) ? null : vin), ymme: ymme }
  // (2) OEM references (3D model/specs/parts list) if available
  OEM = CLOUD.getOEMReferences(ID)   // may be null/partial
  // (3) Capture exterior scan (camera + IMU + optional depth)
  UI.message("Scan exterior; walk around vehicle with overlap.")
  IMU.start( ); CAM.startVideo( ); if DEPTH.available( ): DEPTH.start( )
  UI.wait("Tap OK when scan complete")
  SCAN = { frames: CAM.stopVideo( ), imu: IMU.stop( ), depth: (DEPTH.available( ) ?
DEPTH.stop( ) : null) }
  // (4) Optional auxiliary sensors
  AUXDATA = (AUX.available( ) and UI.confirm("Use auxiliary sensors?")) ?
       AUX.scan(["MAGNETIC", "ULTRASONIC", "INFRARED"]) : null
  // (5) AI processing in 3 grouped calls
  MODEL3D = AI.Build3DModel(SCAN, AUXDATA)                //
reconstruct actual 3D
  COMPARE = AI.CompareToReference(MODEL3D, OEM.model3D, OEM.specs)
// align/diff or anomaly-only
  FINDINGS = AI.GenerateFindings(COMPARE, MODEL3D, OEM.partsList, AUXDATA)
// deviations, damage, non-OEM
  // (6) Initial report
  R1 = Report(type="INITIAL", id=ID, oem=OEM, findings=FINDINGS,
artifacts=[MODEL3D, COMPARE])
  CLOUD.save(R1)
  // (7) Diagnostics (OBD + user service check)
  DIAG = { }
  if OBD.connect( ):
    DIAG.dtc = OBD.readDTCs( )
    DIAG.live = OBD.readLivePIDs(optional=true)
    DIAG.freeze = OBD.readFreezeFrames(optional=true)
    DIAG.odo = OBD.readOdometerCandidates(optional=true)
    DIAG.ev = OBD.readEVBatteryParams(optional=true)   // SOC/SOH/cell
temps/voltage if supported
  DIAG.service = { oil: UI.text("Oil", ""), brakes: UI.text("Brakes", ""), tires:
UI.tires(optional=true), notes: UI.text("Notes", "") }
  DIAG.derived = AI.DeriveDiagnostics(DIAG)      // collision risk, battery health,
odo consistency (optional)
  // (8) Secondary report
  R2 = Report(type="DIAGNOSTIC", id=ID, diag=DIAG)
  CLOUD.save(R2)
  // (9) Comprehensive report (costs + valuation)
  region = UI.text("Region", "")
  mileage = bestMileage(DIAG.odo) ?? UI.number("Mileage", 0)
  COSTS = Estimator. Costs(FINDINGS, DIAG, region, CLOUD)
  VALUE = Estimator.Valuation(ID, FINDINGS, DIAG, region, mileage, CLOUD)
  R3 = Report(type="COMPREHENSIVE", id=ID, reports=[R1, R2], costs=COSTS,
valuation=VALUE)
  CLOUD.save(R3)
  UI.showReport(R3)
  return R3
```

The pseudocode set forth above illustrates one example implementation of a mobile-based vehicle inspection system and is intended to describe functional stages of operation rather than a limiting sequence of steps. In one embodiment, vehicle identification information is obtained using a vehicle diagnostic interface, such as an OBD connector, to retrieve a VIN. Where automated retrieval is unavailable or incomplete, vehicle identifying information, including year, make, model, and engine data, may be manually entered by a user. The retrieved or entered identifying information is used to request manufacturer reference data from a remote server, which may include one or more three-dimensional reference models, dimensional specifications, component lists, and tolerance information associated with the identified vehicle. In some instances, such reference data may be partially available or unavailable, and the system is configured to continue operation using alternative comparison techniques as described below.

Exterior vehicle data is captured using a mobile device camera while a user moves around the vehicle. Image frames are captured in sequence and may be associated with inertial measurement unit data, such as accelerometer and gyroscope data, to enable estimation of camera pose and relative motion between frames. Where available, depth data may additionally be captured using a depth sensor, such as a LiDAR or time-of-flight sensor integrated into the mobile device. The captured image, inertial, and optional depth data together constitute scan data representing the exterior geometry of the vehicle.

In some embodiments, auxiliary sensors may be optionally used to supplement the camera-based scan. Such auxiliary sensors may include magnetic sensors configured to detect variations indicative of filler material or repainting, ultrasonic sensors configured to detect surface irregularities or thickness variations, and infrared sensors configured to detect temperature or reflectivity inconsistencies. Data produced by such auxiliary sensors may be spatially correlated with the camera-based scan data using relative position information, timestamps, or user-guided scanning patterns.

Artificial intelligence processing is employed to generate an actual three-dimensional representation of the vehicle based on the captured scan data. This processing may include extracting visual features from image frames, matching corresponding features across frames, estimating camera poses using visual-inertial techniques, and reconstructing a three-dimensional point cloud or mesh using multi-view geometry, depth-assisted reconstruction, or other suitable techniques. The resulting three-dimensional model represents the exterior geometry of the inspected vehicle.

Where a manufacturer reference model is available, the reconstructed three-dimensional vehicle model is aligned with the reference model using a registration process, such as an iterative closest point alignment or other suitable geometric alignment technique. After alignment, geometric deviations between the reconstructed model and the reference model are computed to generate a deviation map identifying areas that exceed expected tolerances. Where a manufacturer reference model is unavailable or incomplete, the system may instead perform intra-model anomaly detection, nearest-fit comparison against generalized vehicle classes, or other statistical or geometric techniques to identify irregularities in the reconstructed model.

Based on the comparison results, the system generates findings that may include identification of structural deformation, detection of damaged areas, and identification of suspected non-original or replacement components. Such findings may be derived from geometric deviations, texture or appearance inconsistencies in image data, and corroborating signals from auxiliary sensor data. In some embodiments, confidence scores may be assigned to findings based on agreement among multiple data sources.

The system further performs intelligent diagnostics by retrieving vehicle diagnostic data through the OBD interface. Such diagnostic data may include diagnostic trouble codes, freeze frame data, live operational parameters, odometer readings from one or more control modules, and, for hybrid or electric vehicles, battery-related parameters such as state of charge, state of health, cell temperature, and voltage. The system may analyze such diagnostic data to infer prior collision events, battery degradation, or inconsistencies indicative of tampering. User-entered service condition information, such as fluid levels, brake condition, or tire pressure, may also be incorporated.

The results of the exterior analysis and the diagnostic analysis are used to generate multiple reports. An initial report may summarize structural and component-related findings derived from the exterior scan. A secondary report may summarize diagnostic and service-condition findings. A comprehensive report may aggregate the results of the prior reports and further include estimated repair costs, replacement part costs, and vehicle valuation information obtained using market data, regional pricing information, or third-party valuation services. All reports may be stored locally, transmitted to a remote server, or both, and may include visual artifacts such as deviation maps, annotated images, or diagnostic summaries.

The foregoing description is intended to illustrate representative implementations of the system and does not limit the invention to any particular algorithms, sensor configurations, or execution order. Functional stages may be performed sequentially, concurrently, or asynchronously, and alternative implementations using equivalent techniques may be employed without departing from the scope of the invention.

Figure 4:
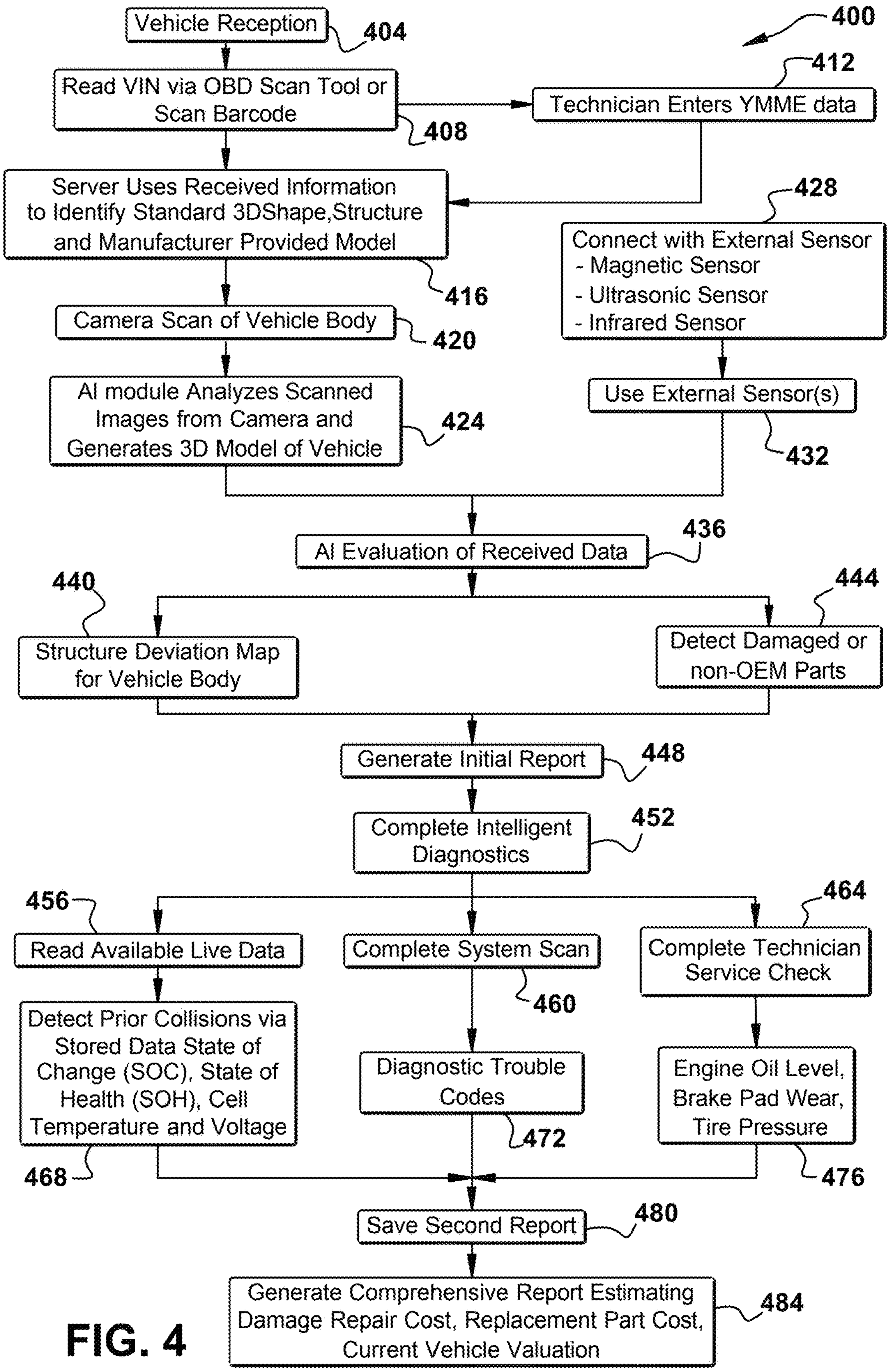
FIG. 4 illustrates example embodiment of an operational flow diagram for a multi-domain vehicle condition system via OBD data and image-based deep learning classification.

FIG. 4 illustrates an example embodiment of an operational flow diagram for a multi-domain vehicle condition system via OBD data and image-based deep learning classification. The process begins at block 404 with a vehicle reception stage, in which a vehicle to be inspected is received at a service location or otherwise made available for inspection by a technician or user. Following vehicle reception, vehicle identification information is obtained by reading a VIN via an OBD scan tool or by scanning a barcode associated with the vehicle at block 408. In instances where the VIN cannot be successfully retrieved through automated scanning, the technician manually enters vehicle identifying information, including YMME data at block 412.

Once vehicle identifying information is obtained, a server uses the received information to identify a corresponding standard three-dimensional shape, structure, and manufacturer-provided reference model for the vehicle at block 416. This reference data may include OEM-provided CAD models, structural specifications, dimensional tolerances, and component configuration information associated with the identified vehicle.

After identifying the standard reference model, a camera scan of the vehicle body is performed at block 420. During this stage, a camera associated with a mobile device captures images of the exterior of the vehicle as the technician moves around the vehicle. In parallel with or in addition to the camera scan, one or more external sensors may be connected, including a magnetic sensor, an ultrasonic sensor, and an infrared sensor. The external sensor or sensors are then used to scan the vehicle body to collect additional surface, material, or subsurface information.

Image data obtained from the camera scan is provided to an AI module at block 424 The AI module analyzes the scanned images and generates a three-dimensional model of the actual vehicle. Data obtained from the external sensor or sensors at block 428 and utilized at block 432. This data is likewise provided to the system and may be spatially aligned with the generated three-dimensional vehicle model. The outputs of the camera-based analysis and the external sensor analysis are then provided to an AI evaluation stage at block 436 in which all received data is compared against the standard reference model and related manufacturer data.

Based on this evaluation, the system generates a structure deviation map for the vehicle body, identifying geometric deviations, distortions, or misalignments relative to the standard model at block 440. In parallel, the system detects damaged parts or non-OEM parts by analyzing geometric discrepancies, material inconsistencies, sensor-detected anomalies, or mismatches with manufacturer specifications at block 444. The results of these analyses are combined to generate an initial report summarizing structural deviations and detected component issues at block 448.

Following generation of the initial report, the system proceeds to complete intelligent diagnostics at block 452. This stage includes reading available live data from vehicle systems at block 456, performing a complete system scan at block 460, and completing a technician service check at block 464. Reading available live data at block 456 may include accessing stored or real-time vehicle data to detect prior collisions and to retrieve battery-related parameters such as SOC, SOH, cell temperature, and voltage, particularly for hybrid or electric vehicles at block 468. The complete system scan retrieves DTCs from vehicle control modules at block 472. A technician service check at block 464 may include inspection or entry of service-related parameters such as engine oil level, brake pad wear, and tire pressure at block 476.

The outputs of the live data analysis, system scan, and technician service check are combined and saved as a second report at block 480. Finally, the system generates a comprehensive report at block 484 that estimates damage repair costs, replacement part costs, and a current valuation of the vehicle based on the aggregated results of the structural analysis, component authenticity evaluation, diagnostic data, and service condition assessment.

FIGS. 5-11 are tables that further illustrate representative aspects of the vehicle inspection system and are intended to supplement the accompanying figures, flowcharts, and pseudocode. The tables identify example data sources, processing stages, and operational behaviors suitably employed by example embodiments. The tables are illustrative only and do not limit the invention to any particular sensors, parameters, algorithms, or execution order.

The table of FIG. 5 illustrates representative sensors and data sources that may be used by the system, along with the types of data captured and their analytical purposes. As shown, the system may obtain image data, motion data, depth data, auxiliary sensor data, and vehicle diagnostic data from one or more sources. Certain data sources, such as a mobile device camera and inertial measurement unit, may be used in most embodiments, while other data sources, such as depth sensors or auxiliary material sensors, may be optional. The table demonstrates that the system is designed to operate flexibly across different device capabilities while supporting multi-modal analysis.

The table of FIG. 6 illustrates categories of vehicle diagnostic parameters that are suitably retrieved via an on-board diagnostic interface. Rather than relying on specific proprietary parameter identifiers, the system groups diagnostic information into functional categories, such as identification data, fault information, operational data, mileage data, and electric or hybrid vehicle data. This categorical approach enables the system to function across different vehicle makes, models, and model years while supporting analysis of vehicle condition, prior events, and consistency among reported values.

The table of FIG. 7 illustrates representative artificial intelligence processing stages suitably employed by the system. These stages include feature extraction, three-dimensional reconstruction, model alignment, deviation analysis, and classification or scoring. The table demonstrates that the AI functionality is implemented as a sequence of technical processing operations that transform raw sensor and image data into structured outputs, such as three-dimensional models, deviation maps, and classified findings. The example techniques listed for each stage are non-limiting and illustrate that the AI functionality may be implemented using a variety of known computer vision and machine-learning approaches.

The table of FIG. 8 illustrates an example embodiment of staged reporting structure generated by the system. As shown, different reports are suitably produced at different points in the inspection workflow, including an initial report based on exterior inspection data, a diagnostic report based on vehicle diagnostic data and user inputs, and a comprehensive report that aggregates results and provides cost or valuation information. The table highlights that each report serves a distinct technical purpose and that staged reporting enables independent analysis of physical and electronic evidence prior to aggregation The table of FIG. 9 illustrates representative types of manufacturer reference data and how such data is suitably utilized by the system. Manufacturer reference data may include three-dimensional models, dimensional specifications, and component lists. The table demonstrates that such reference data is used to anchor analysis to factory conditions, enabling objective deviation detection, tolerance-based classification, and identification of non-original components. The system may operate even when some or all reference data is unavailable, as described elsewhere herein.

The table of FIG. 10 illustrates examples of auxiliary sensors that are suitably employed by the system and the types of physical phenomena they detect. These sensors provide corroborative information relating to material composition, thickness variation, or thermal behavior. As shown, auxiliary sensor data may be used to support or refine findings derived from image-based and geometric analysis, thereby increasing confidence in detected conditions without being required for system operation.

The table of FIG. 11 illustrates representative fallback and degradation behaviors of the system when certain inputs are unavailable. The table demonstrates that the system is designed to adapt dynamically to missing or incomplete data by employing alternative analysis techniques, such as intra-model anomaly detection, manual vehicle identification input, or reduced-confidence assessments. This adaptive behavior enables the system to remain functional across a wide range of inspection environments and device capabilities.

Collectively, the tables of FIGS. 5-11 illustrate how the system suitably integrates multiple data sources, processing stages, and reporting outputs into a unified inspection workflow. The tabular descriptions are intended to aid understanding of representative embodiments and should not be construed as limiting the scope of the invention.

FIGS. 12A and 12B show an example initial output report for a 2121 Honda Accord following completion of the exterior inspection stage and associated artificial intelligence processing, but prior to ingestion or analysis of vehicle diagnostic data obtained via an on-board diagnostic interface. The initial output report represents a first-stage analytical result derived primarily from physical inspection of the vehicle exterior and optional auxiliary sensor data, and is configured to summarize structural, surface, and component-related findings identified at that stage of the inspection workflow.

The initial output report includes vehicle identification information, such as a vehicle identification number and associated year, make, model, and engine information, which may be obtained automatically or through user input. The report further includes inspection metadata, such as an inspection identifier and timestamp, which enable traceability and association of the report with a specific inspection event.

The initial output report further includes a reconstructed three-dimensional representation of the exterior of the vehicle, generated using image-based reconstruction techniques and associated motion data. The report may indicate that a deviation map or similar comparative representation has been generated by aligning the reconstructed vehicle model with a manufacturer reference model or expected structural geometry. The deviation map identifies areas where the inspected vehicle deviates from factory geometry or expected tolerances, and such deviations may be summarized textually within the report.

The report includes a structured summary of preliminary exterior findings. These findings may identify specific vehicle areas, such as panels, doors, bumpers, or quarter panels, and may describe detected geometric deviations, surface irregularities, or sensor-detected anomalies. For each identified area, the report may indicate whether detected conditions exceed manufacturer tolerances, are consistent with prior repair activity, or suggest the presence of non-original components. The report may further include preliminary assessments of whether detected conditions are structural or cosmetic in nature.

In some embodiments, the initial output report includes component authenticity indicators derived from geometric alignment, surface analysis, and optional auxiliary sensor data. Such indicators may identify components that are suspected to be non-original or replacement parts, or that exhibit characteristics inconsistent with manufacturer reference data. The report may also identify exterior components for which no anomalies were detected.

The initial output report may further include confidence indicators associated with one or more findings. Confidence indicators may be derived based on agreement among multiple data sources, such as image-based geometry, auxiliary sensor signals, and manufacturer reference tolerances. The report may distinguish between findings with relatively high confidence and findings with lower or moderate confidence, without requiring diagnostic data at this stage.

The initial output report expressly excludes or notes the absence of vehicle diagnostic data. In one embodiment, the report indicates that diagnostic trouble codes, electronic control module data, service history information, and other electronically derived data have not yet been incorporated. This explicit separation establishes the initial output report as a baseline physical condition assessment derived independently of electronic diagnostic evidence.

The initial output report serves multiple technical purposes within the system. First, it provides an early assessment of the vehicle's exterior condition based on physical evidence alone. Second, it establishes a reference point against which subsequent diagnostic findings may be correlated or reconciled. Third, it enables staged analysis by allowing physical inspection results to be reviewed, stored, or transmitted prior to completion of a full diagnostic workflow. In some embodiments, the initial output report may be presented to a user, technician, or downstream system to guide further inspection, diagnostic prioritization, or decision-making.

The initial output report may be stored locally on a mobile device, transmitted to a remote server, or archived for later comparison with subsequent inspection reports. The report may also be incorporated into a later-generated comprehensive report, while retaining its independent analytical significance as a discrete output representing the results of the exterior inspection stage.

The initial output report is thus configured to capture and communicate the results of automated exterior analysis in a structured, interpretable format, and to support subsequent multi-domain correlation without requiring that all data sources be available or processed simultaneously.

FIGS. 13A, 13B and 13C show an example comprehensive output report as a follow-up to the initial output report described above. The final output report is generated after completion of vehicle diagnostic data acquisition and associated analysis, and is configured to integrate, reconcile, and build upon the findings previously identified in the initial output report. Whereas the initial output report represents a baseline physical condition assessment derived from exterior inspection data, the final output report represents a consolidated, multi-domain assessment that incorporates both physical inspection results and electronic diagnostic evidence.

The final output report includes vehicle identification information and inspection metadata corresponding to the initial output report, thereby maintaining continuity between inspection stages. The final output report further includes a summary or recap of selected findings from the initial output report, which may identify previously detected structural deviations, suspected repair activity, or component authenticity indicators. This recap establishes context for subsequent analysis and enables traceability between initial and final findings.

The final output report includes results derived from vehicle diagnostic data obtained via an on-board diagnostic interface. Such diagnostic data may include diagnostic trouble codes, freeze frame data, live operational parameters, odometer values obtained from multiple control modules, and, where applicable, battery or voltage-related parameters for hybrid or electric vehicles. The report may summarize whether active or historical diagnostic events were detected and may identify diagnostic information relevant to vehicle condition, prior collision events, or system integrity.

In the final output report, diagnostic findings are correlated with the physical findings identified in the initial output report. For example, electronic diagnostic events may be evaluated in relation to the location, timing, or nature of structural deviations detected during exterior inspection. The system may determine whether diagnostic evidence supports, contradicts, or refines preliminary physical findings, and may adjust confidence assessments accordingly.

This correlation enables the system to infer vehicle condition with greater accuracy than would be possible using either physical inspection data or diagnostic data alone.

Based on the combined analysis, the final output report includes an updated condition assessment that reflects reconciled findings across inspection domains. The report may confirm prior repair activity, distinguish between cosmetic and structural conditions, identify likely non-original components, and clarify the significance of detected anomalies. Confidence indicators associated with individual findings may be updated to reflect agreement among image-based analysis, auxiliary sensor data, diagnostic evidence, and manufacturer reference information.

The final output report may further include repair cost estimation and vehicle valuation information derived from the combined assessment. Repair cost estimates may be generated based on confirmed findings, manufacturer part pricing data, regional labor rates, and the scope of identified repairs. Vehicle valuation information may be adjusted to account for confirmed repair history, current condition, and market comparison data. Such estimates are presented as illustrative ranges and are not limited to a particular pricing methodology.

The final output report is configured to supersede or augment the initial output report while preserving the initial report as a distinct analytical artifact. In this manner, the system maintains a staged reporting structure in which the initial output report provides an independent physical assessment baseline and the final output report provides an integrated, decision-support-oriented assessment. The final output report may be presented to a user, technician, insurer, or downstream system, stored for record-keeping, or transmitted for further processing.

Accordingly, the final output report functions as a comprehensive representation of vehicle condition that incorporates and contextualizes the findings of the initial output report example, enabling automated, multi-domain inference regarding vehicle history, condition, and value.

FIG. 14 is a table illustrating representative categories of DTCs and associated diagnostic information that may be used by the system as secondary indicators for corroborating collision-related physical conditions identified through exterior geometric analysis. The DTC categories shown in the table are provided for explanatory purposes only and are not intended to be exhaustive or limiting. The presence or absence of any particular DTC does not, by itself, indicate collision damage. Rather, the DTC categories listed in the represent examples of diagnostic information that may acquire evidentiary significance when evaluated in correlation with spatially localized exterior geometric deviations or structural anomalies.

As shown, one category of diagnostic information includes sensor plausibility or correlation-related DTCs, which indicate inconsistencies between sensor readings or between sensor readings and expected physical relationships. Such DTCs may arise when physical components, mounts, brackets, or airflow paths are altered due to collision damage or repair activity, even though the affected sensors remain operational. When correlated with geometric deviations localized to a corresponding vehicle region, such plausibility-related DTCs may provide corroborative evidence of physical deformation, misalignment, or non-standard component installation.

Another category includes inter-module communication or vehicle network-related DTCs, such as codes indicating intermittent, delayed, or lost communication between vehicle control modules. These DTCs may be consistent with damaged wiring, disturbed connectors, grounding issues, or module replacement activity commonly associated with collision damage or post-collision repair. When such communication-related DTCs correspond to a region of the vehicle exhibiting geometric anomalies, they may further corroborate the existence of prior collision damage or repair-related degradation.

The table further includes calibration, configuration, or variant mismatch-related DTCs, which indicate discrepancies between expected and actual module configurations, calibration identifiers, or vehicle variants. Such DTCs may be indicative of non-OEM components, improperly programmed replacement modules, salvage repairs, or incomplete post-collision configuration procedures. When correlated with exterior geometric deviations, these DTCs may assist in identifying non-standard components or repair quality issues.

Also shown are control authority limit or compensation-related DTCs, which may indicate that a vehicle subsystem is operating near expected limits or exhibiting compensatory behavior. Such DTCs may reflect altered airflow, cooling performance, alignment, or structural conditions resulting from collision damage or repair modifications. These DTCs are not treated as fault indicators in isolation, but may provide corroborative insight when evaluated alongside corresponding geometric anomalies.

Additional categories include chassis, stability, steering, or alignment-related DTCs, which may be consistent with frame damage, suspension misalignment, or structural repair issues. When such DTCs are spatially or functionally associated with geometric deviations identified in the same vehicle region, they may further support identification of collision-related physical conditions.

The table also includes historical or transient diagnostic records, such as previously stored or cleared DTCs and associated freeze-frame or event data. Such historical diagnostic information may reflect prior collision or repair events even when no active DTCs are present at the time of inspection. The system may evaluate such historical data as part of the correlated analysis to provide additional context regarding the vehicle's physical history.

In certain embodiments, the system is further configured to generate repair-related outputs, including repair orders, identified replacement parts, and estimated repair costs, based on the diagnostic assessment generated from the correlated exterior geometric analysis and diagnostic parameter evaluation. These repair-related outputs are generated as a post-assessment process that leverages the identified physical condition of the vehicle and the localized region, structure, or subsystem associated with that condition.

Following generation of the diagnostic assessment indicative of a physical condition of the vehicle, the one or more processors may classify the identified condition according to one or more condition categories, including, by way of example, structural deformation, component misalignment, repainting, non-standard or non-OEM component installation, incomplete or substandard repairs, or combinations thereof. The processors may further associate the identified condition with one or more affected vehicle regions or subsystems determined during the correlation process.

In some embodiments, the processors are configured to map the identified physical condition and affected vehicle region or subsystem to one or more corresponding repair actions. The mapping may be performed using predefined repair-action mappings stored in memory, rule-based associations, or data structures that associate types of geometric deviations, structural anomalies, or correlated diagnostic indicators with standard repair operations. Example repair actions include component replacement, component realignment, panel refinishing, fastener replacement, inspection of associated mounting structures, or recalibration of affected vehicle systems. The repair-action mappings may be vehicle-specific and may be indexed using vehicle identification data such as a VIN or YMME information.

In some embodiments, the processors are further configured to identify parts required to perform the mapped repair actions. The processors may query one or more parts databases, including manufacturer parts catalogs or third-party parts databases, using vehicle identification data and the identified repair actions to retrieve part identifiers, part descriptions, and compatibility information. The identified parts may include original equipment manufacturer (OEM) parts, aftermarket parts, or alternative components, and the system may optionally classify parts based on origin, availability, or quality tier.

In some embodiments, the processors are further configured to determine labor operations and associated labor times corresponding to the mapped repair actions. Labor operations may be identified using predefined labor operation mappings, manufacturer service information, or third-party labor guides. Each labor operation may be associated with an estimated labor duration, which may be expressed in standardized labor time units. Labor times may be vehicle-specific and may depend on the identified repair actions and affected vehicle regions or subsystems.

In some embodiments, the processors are configured to generate estimated repair costs by combining identified parts costs and labor costs. Parts costs may be obtained from parts databases, pricing services, or stored pricing tables and may include list prices, discounted prices, or region-specific pricing. Labor costs may be calculated by applying one or more labor rates to the estimated labor durations, where the labor rates may be configurable based on repair facility, geographic region, insurer requirements, or other parameters. The processors may further incorporate additional costs, such as materials, paint, shop supplies, taxes, or fees.

In some embodiments, the processors are configured to generate a repair estimate or repair order document that itemizes identified repair actions, required parts, labor operations, and associated costs.

FIG. 15 illustrates an example embodiment of a repair estimate or repair order formatted for use by a repair facility, insurer, vehicle dealer, or end use. In example embodiments, line items in the repair estimate or repair order are traceable to the diagnostic assessment and correlated evidence that led to the identification of the underlying physical condition, thereby providing transparency and justification for the proposed repairs.

The repair planning, parts identification, and cost estimation processes described herein may be performed automatically or semi-automatically and may be updated dynamically as additional geometric data, diagnostic data, or correlation results become available. The described repair-related outputs are illustrative examples of downstream applications enabled by the disclosed system and do not limit the scope of the invention.

In certain embodiments, the system generates a repair estimate output report that presents repair planning, parts identification, labor estimation, and cost information derived from the diagnostic assessment generated by the system. An example repair estimate report is illustrated in the accompanying drawing.

The repair estimate report includes a vehicle information section that identifies the vehicle to which the assessment pertains. The vehicle information section may include one or more of a VIN, YMME, mileage, and an assessment or report identifier. This information enables the report to be associated with a specific vehicle and inspection event and may be obtained from on-board diagnostic data, user input, barcode or VIN scanning, or combinations thereof.

The report also includes a visual condition summary section that presents a graphical representation of the vehicle and an indication of detected physical conditions. The visual condition summary may include a schematic or top-down representation of the vehicle and may visually highlight one or more regions of the vehicle associated with detected geometric deviations or structural anomalies. The visual summary provides an at-a-glance indication of affected vehicle regions corresponding to the diagnostic assessment.

The repair estimate report further includes a repair estimate section that itemizes proposed repair actions. The repair estimate section may include multiple line items, each corresponding to a specific repair action associated with an identified physical condition of the vehicle. For each repair action, the report may list a textual description of the action, such as replacement, realignment, refinishing, or inspection of a vehicle component or region.

Each repair action line item includes an associated parts subsection identifying one or more parts required to perform the repair action. The parts subsection may include part descriptions and associated parts costs. The identified parts may include original equipment manufacturer (OEM) parts, aftermarket parts, or alternative components, and the parts costs may be obtained from manufacturer parts catalogs, third-party parts databases, or stored pricing information.

Each repair action line item includes a labor subsection identifying an estimated labor time required to perform the repair action. Labor times may be expressed in standardized labor units or hours and may be derived from manufacturer service information, predefined labor operation mappings, or third-party labor guides.

he repair estimate section includes a cost subsection that aggregates parts costs and labor costs for each repair action to produce an estimated cost for the individual line item. The report may further aggregate the individual line item costs to produce a subtotal representing the estimated repair cost prior to additional charges.

The repair estimate report includes a diagnostic correlation summary section that summarizes diagnostic information correlated with the detected geometric deviations or structural anomalies. The diagnostic correlation summary may list one or more diagnostic indicators, such as logged events, sensor observations, or parameter variations, that were evaluated in combination with exterior geometric analysis to support the diagnostic assessment. The diagnostic correlation summary provides transparency into how diagnostic information contributed to identification of the physical vehicle condition.

The report further includes a total cost summary section that presents an estimated total repair cost. The total cost summary may include a subtotal, additional charges such as taxes, fees, materials, or shop supplies, and a final estimated total repair cost. The total cost summary provides a concise financial summary suitable for use by a repair facility, insurer, dealer, or vehicle owner.

The repair estimate report illustrated in the drawing is an example output generated by the system and is provided for illustrative purposes only. The specific layout, formatting, fields, and ordering of information may vary without departing from the scope of the disclosure. The report may be generated in electronic form, printed form, or both, and may be transmitted, stored, or integrated into other systems as part of a repair workflow, valuation process, or vehicle condition assessment process.

In certain example embodiments, the repair estimate output report is generated autonomously by the system without requiring manual intervention, manual data entry, or subjective assessment by a technician. In such embodiments, the one or more processors automatically initiate generation of the repair estimate report upon completion of the diagnostic assessment produced from the correlated exterior geometric analysis and diagnostic parameter evaluation.

Autonomous report generation is suitably triggered by satisfaction of one or more predefined conditions, including completion of three-dimensional geometric reconstruction, completion of correlation between geometric deviations or structural anomalies and diagnostic parameter variations, or determination that a physical vehicle condition meets a reporting criterion. The system may generate the report immediately following completion of the diagnostic assessment or may generate the report asynchronously as part of a batch process or scheduled workflow.

In example autonomous embodiments, the system automatically determines affected vehicle regions, associated physical conditions, corresponding repair actions, required parts, labor operations, and estimated costs based on stored mappings, rules, or data structures, without requiring confirmation or selection by a user. Vehicle identification data, parts catalog data, labor operation data, and pricing information are retrieved automatically by the system using previously acquired vehicle identification information and stored configuration parameters.

The autonomously generated repair estimate report may include one or more of a vehicle information section, a visual condition summary, an itemized repair estimate section, a diagnostic correlation summary, and a total cost summary, as described herein. Each portion of the report may be populated automatically based on the diagnostic assessment and downstream repair planning processes performed by the system.

In some example embodiments, the system further assigns confidence levels, severity indicators, or explanatory annotations to one or more repair actions or cost line items to indicate the degree of correlation between geometric evidence and diagnostic indicators that contributed to identification of the underlying physical condition. Such annotations may be generated automatically based on correlation scores, rule outcomes, or other correlation significance measures.

Autonomous generation of the repair estimate report does not preclude subsequent review, modification, or approval by a user. In some embodiments, the autonomously generated report is presented as a draft repair estimate, while in other embodiments the report is designated as a finalized output suitable for submission to a repair facility, insurer, dealer, or valuation system without further modification.

The autonomous report generation described herein enables consistent, repeatable, and scalable production of repair estimates derived from objective multi-domain analysis, reducing reliance on manual inspection workflows and minimizing variability introduced by human judgment. The described autonomous operation is an example embodiment, and the system may alternatively support semi-autonomous or user-assisted report generation without departing from the scope of the disclosure.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for identifying vehicle conditions indicated by correlated exterior geometric deviations and diagnostic parameter variations that are individually insufficient to indicate a diagnostic fault, the system comprising:

one or more processors and associated memory, the memory configured to store a manufacturer reference model corresponding to a manufacturer-specified geometry of a vehicle;

a data interface configured to receive image data and associated motion data corresponding to a continuous sequence of exterior images of the vehicle captured from an associated camera and fixedly associated motion sensor while concurrently being moved relative to the vehicle;

the data interface including a diagnostic link connector (DLC) interface configured to receive on-board diagnostic (OBD) data from the vehicle, the OBD data including diagnostic parameters obtained from one or more vehicle control modules of the vehicle; and the one or more processors configured to generate a three-dimensional geometric model of at least a portion of the vehicle from the received image data and the associated motion data, when the manufacturer reference model is stored in the memory, retrieve the manufacturer reference model from the memory and perform a geometric deviation analysis including aligning the three-dimensional geometric model with the manufacturer reference model to determine geometric deviations indicative of physical deformation, misalignment, or non-standard parts, when the manufacturer reference model is unavailable, perform a structural anomaly analysis of the three-dimensional geometric model to identify structural anomalies based on at least one of symmetry analysis, geometric consistency analysis, or learned baseline models, and correlate results of the geometric deviation analysis or the structural anomaly analysis with the OBD data received from the vehicle by evaluating whether the diagnostic parameter variations that are individually insufficient to indicate the diagnostic fault correspond to the geometric deviations that are spatially localized or the structural anomalies that are associated with a common vehicle region, structure, or subsystem, thereby generating a diagnostic assessment indicative of a physical condition of the vehicle that is associated with the geometric deviations that are spatially localized or the structural anomalies that are associated with the common vehicle region, structure, or subsystem and that is not identifiable from the geometric deviation analysis or the structural anomaly analysis or the OBD data alone.

2. The system of claim 1, wherein correlating comprises evaluating correspondence using predefined correlation rules that relate categories of the geometric deviations or categories of the structural anomalies to categories of the diagnostic parameter variations associated with the common vehicle region, structure, or subsystem.

3. The system of claim 2, wherein evaluating correspondence comprises combining metrics of the geometric deviation or metrics of the structural anomalies with the diagnostic parameter variations to determine a correlation significance, without requiring any diagnostic parameter variation to independently indicate the diagnostic fault.

4. The system of claim 3, wherein determining the correlation significance comprises computing a correlation score based on a weighted combination of normalized metrics of the geometric deviation or normalized metrics of the structural anomalies and normalized values of the diagnostic parameter variations, and generating the diagnostic assessment when the correlation score satisfies region-level correspondence criteria defined by the predefined correlation rules.

5. The system of claim 1, wherein the one or more processors are further configured to:

receive vehicle identification data corresponding to one or more of a Vehicle Identification Number (VIN) or a Year, Make, Model, and Engine (YMME) identifying the vehicle;

query an associated database with the vehicle identification data;

receive the manufacturer reference model responsive to the query; and store the received manufacturer reference model in the memory.

6. The system of claim 2, wherein correlating results of the geometric deviation analysis or the structural anomaly analysis with the OBD data comprises:

associating the geometric deviations or the structural anomalies with one or more diagnostic indicators obtained from the vehicle via the DLC interface, the diagnostic indicators including at least one of diagnostic trouble codes (DTCs), electronic control unit (ECU) status information, event-related data, or vehicle usage data; and weighting or confirming the geometric deviations or structural anomalies based on a correspondence between an affected vehicle region and the one or more diagnostic indicators to increase confidence that the diagnostic assessment is indicative of the physical condition of the vehicle.

7. The system of claim 3, wherein the one or more processors are further configured to align the received manufacturer reference model with the three-dimensional geometric model of the vehicle by normalizing manufacturer-provided geometric data of the manufacturer reference model into a coordinate space defined by the three-dimensional geometric model of the vehicle, the normalizing comprising applying one or more of scaling, translation, rotation, and reference-plane adjustments, such that structural deviations are identified based on spatial correspondence between the models rather than nominal dimensional values.

8. The system of claim 1, wherein the one or more processors and associated memory are included in a portable digital device comprising a smartphone or tablet computer, and wherein:

the data interface receives the image data from a camera integrated into the portable digital device;

the data interface receives the motion data from an inertial measurement unit (IMU) integrated into the portable digital device; and the DLC interface comprises a wireless OBD interface communicatively coupled to the portable digital device.

9. The system of claim 1, wherein generating the three-dimensional geometric model of at least a portion of the vehicle comprises:

determining relative spatial positions and orientations of the associated camera at a plurality of capture instances based on the received motion data and image feature correspondence between successive exterior images;

selecting a subset of the exterior images having a predetermined degree of spatial overlap based on the determined relative positions and orientations; and combining geometric information derived from the selected exterior images to form a spatially consistent three-dimensional representation of the vehicle exterior.

10. The system of claim 1, wherein generating the three-dimensional geometric model of at least a portion of the vehicle comprises:

estimating a plurality of camera poses corresponding to the continuous sequence of exterior images based on the received motion data and feature correspondence between successive images;

reconstructing a three-dimensional point cloud of the vehicle exterior from the exterior images using multi-view geometric reconstruction; and forming a surface representation of the vehicle exterior from the point cloud, the surface representation defining the three-dimensional geometric model used for subsequent geometric deviation analysis or structural anomaly analysis.

11. A method for identifying vehicle conditions indicated by correlated exterior geometric deviations and diagnostic parameter variations that are individually insufficient to indicate a diagnostic fault, the method comprising:

receiving image data corresponding to a continuous sequence of exterior images of the vehicle captured from an associated camera while the camera is moved relative to the vehicle;

receiving motion data associated with movement of the camera relative to the vehicle;

receiving on-board diagnostic (OBD) data from the vehicle via a diagnostic link connector interface, the OBD data including diagnostic parameters obtained from one or more vehicle control modules of the vehicle;

generating a three-dimensional geometric model of at least a portion of the vehicle based on the received image data and the received motion data;

when a manufacturer reference model corresponding to the vehicle is stored in memory, performing a geometric deviation analysis including aligning the three-dimensional geometric model with the manufacturer reference model to determine geometric deviations indicative of physical deformation, misalignment, or non-standard parts;

when the manufacturer reference model is not stored in memory, performing a structural anomaly analysis of the three-dimensional geometric model to identify structural anomalies based on at least one of symmetry analysis, geometric consistency analysis, or learned baseline models; and correlating results of the geometric deviation analysis or the structural anomaly analysis with the received OBD data by evaluating whether the diagnostic parameter variations that are individually insufficient to indicate the diagnostic fault correspond to the geometric deviations that are spatially localized or the structural anomalies that are associated with a common vehicle region, structure, or subsystem, thereby generating a diagnostic assessment indicative of a physical condition of the vehicle that is associated with the geometric deviations that are spatially localized or the structural anomalies that are associated with the common vehicle region, structure, or subsystem and that is not identifiable from the geometric deviation analysis or the structural anomaly analysis or the OBD data alone.

12. The method of claim 11, further comprising:
receiving vehicle identification data corresponding to one or more of a Vehicle Identification Number (VIN) or a Year, Make, Model, and Engine (YMME) identifying the vehicle;
querying an associated database using the vehicle identification data;
receiving a manufacturer reference model responsive to the query; and
storing the received manufacturer reference model in memory for use in aligning the three-dimensional geometric model.

13. The method of claim 11, wherein correlating results of the geometric deviation analysis or the structural anomaly analysis with the received OBD data comprises:
associating the geometric deviations or the structural anomalies with one or more diagnostic indicators including diagnostic trouble codes, electronic control unit status information, event-related data, or vehicle usage data; and
weighting or confirming the geometric deviations or the structural anomalies based on correspondence between affected vehicle regions and the one or more diagnostic indicators.

14. The method of claim 11, wherein aligning the manufacturer reference model with the three-dimensional geometric model comprises:
normalizing manufacturer-provided geometric data into a coordinate space defined by the three-dimensional geometric model by applying one or more of scaling, translation, rotation, and reference-plane adjustments, such that geometric deviations are identified based on spatial correspondence rather than nominal dimensional values.

15. The method of claim 11, wherein generating the three-dimensional geometric model comprises:
estimating a plurality of camera poses corresponding to the continuous sequence of exterior images based on the received motion data and feature correspondence between successive images; and
combining geometric information derived from the exterior images based on the estimated camera poses to form a spatially consistent three-dimensional representation of the vehicle exterior.

16. The method of claim 15, wherein generating the three-dimensional geometric model further comprises:
reconstructing a three-dimensional point cloud of the vehicle exterior from the exterior images using multi-view geometric reconstruction; and
forming a surface representation of the vehicle exterior from the point cloud, the surface representation defining the three-dimensional geometric model used for subsequent geometric deviation analysis or structural anomaly analysis.

17. The method of claim 11, wherein:
the image data is captured using a camera integrated into a portable digital device;
the motion data is obtained from an inertial measurement unit (IMU) integrated into the portable digital device; and
the OBD data is received via a wireless on-board diagnostic interface communicatively coupled to the portable digital device.

18. The method of claim 11, further comprising generating a report based on the diagnostic assessment, the report including one or more of identified physical vehicle conditions, affected vehicle regions or subsystems, associated repair actions, identified replacement parts, estimated labor operations, or estimated repair costs.

19. The method of claim 18, wherein generating the report is performed autonomously by one or more processors without requiring manual input or subjective assessment, and is automatically initiated upon completion of the correlating.

20. A non-transitory computer-readable storage medium storing instructions that, when executed by one or more processors of a portable data device executing a vehicle inspection application to identify vehicle conditions indicated by correlated exterior geometric deviations and diagnostic parameter variations that are individually insufficient to indicate a diagnostic fault, cause the portable data device to:
receive image data from an integrated camera, the image data corresponding to a continuous sequence of exterior images of a vehicle captured while the portable data device is moved relative to the vehicle;
receive motion data from an integrated inertial measurement unit (IMU), the motion data associated with movement of the portable data device relative to the vehicle during image capture;
receive vehicle identification data identifying the vehicle;
receive on-board diagnostic (OBD) data from the vehicle via a wireless diagnostic interface communicatively coupled to a diagnostic link connector of the vehicle, the OBD data including diagnostic parameters obtained from one or more vehicle control modules of the vehicle;
request manufacturer reference information corresponding to the identified vehicle from a manufacturer database via a network interface and receive manufacturer reference information responsive to the request, when available;
generate a three-dimensional geometric representation of at least a portion of the vehicle based on the received image data and the received motion data;
when manufacturer reference information for the vehicle is received, analyze the three-dimensional geometric representation relative to the manufacturer reference information to identify geometric deviations indicative of physical deformation, misalignment, or non-standard parts;
when manufacturer reference information for the vehicle is unavailable, analyze the three-dimensional geometric representation to identify structural anomalies based on at least one of symmetry analysis, geometric consistency analysis, or learned baseline models;
evaluate diagnostic parameters, including diagnostic parameter variations, of the received OBD data in relation to results of the analysis of the three-dimensional geometric representation to corroborate, complement, or supplement the identified geometric deviations or structural anomalies; and generate a diagnostic assessment indicative of a physical condition of the vehicle that is associated with the identified geometric deviations or the identified structural anomalies based at least in part on the evaluation of the received OBD data in relation to results of the analysis of the three-dimensional geometric representation, wherein the physical condition is not identifiable from the analysis of the three-dimensional geometric representation or the OBD data alone;

wherein at least a portion of generation of the three-dimensional geometric representation or the analysis is executed on the portable data device, on a remote cloud computing service accessed via the network interface, or cooperatively by the portable data device and the remote cloud computing service.

21. The non-transitory computer-readable storage medium of claim 20, wherein generating the three-dimensional geometric representation comprises:

estimating a plurality of camera poses corresponding to the continuous sequence of exterior images based on the received motion data and feature correspondence between successive exterior images; and combining geometric information derived from the exterior images based on the estimated camera poses to form a spatially consistent three-dimensional representation of the vehicle exterior.

22. The non-transitory computer-readable storage medium of claim 21, wherein generating the three-dimensional geometric representation further comprises:

reconstructing a three-dimensional point cloud representing the vehicle exterior from the exterior images using multi-view geometric reconstruction; and forming a surface representation of the vehicle exterior from the point cloud, the surface representation defining the three-dimensional geometric representation used in the analysis.

23. The non-transitory computer-readable storage medium of claim 20, wherein, when manufacturer reference information for the vehicle is received, analyzing the three-dimensional geometric representation comprises:

aligning manufacturer-provided geometric data with the three-dimensional geometric representation by normalizing the manufacturer-provided geometric data into a coordinate space defined by the three-dimensional geometric representation using one or more of scaling, translation, rotation, or reference-plane adjustment, such that geometric deviations are identified based on spatial correspondence rather than nominal dimensional values.

24. The non-transitory computer-readable storage medium of claim 20, wherein, when manufacturer reference information for the vehicle is unavailable, analyzing the three-dimensional geometric representation to identify structural anomalies comprises: performing at least one of:

symmetry-based comparison between corresponding regions of the vehicle exterior, geometric consistency evaluation across adjacent or related exterior regions, or learned baseline analysis derived from geometric characteristics of similar vehicles or from intra-vehicle geometric relationships.

25. The non-transitory computer-readable storage medium of claim 20, wherein evaluating the received OBD data comprises:

associating the identified geometric deviations or the identified structural anomalies with one or more electronic vehicle indicators derived from the OBD data, including diagnostic trouble codes, electronic control unit status information, event-related data, or vehicle usage data; and using the associated electronic vehicle indicators to corroborate, complement, or supplement the identified geometric deviations or the identified structural anomalies when generating the diagnostic assessment.

26. The non-transitory computer-readable storage medium of claim 20, wherein the portable data device comprises a smartphone or tablet computer.

* * * * *